(12) United States Patent
Kancharla

(10) Patent No.: US 11,674,910 B2
(45) Date of Patent: Jun. 13, 2023

(54) ROBOTIC SYSTEMS AND METHODS FOR SURFACE IMAGING OF STRUCTURE'S VERTICAL SURFACE

(71) Applicant: ARoboticsCompany, Inc., Ossining, NY (US)

(72) Inventor: Akaash Reddy Kancharla, Armonk, NY (US)

(73) Assignee: AROBOTICSCOMPANY INC., Ossining, NY (US)

( * ) Notice: Subject to any disclaimer, the term of this patent is extended or adjusted under 35 U.S.C. 154(b) by 348 days.

(21) Appl. No.: 17/111,828

(22) Filed: Dec. 4, 2020

(65) Prior Publication Data

US 2022/0178849 A1    Jun. 9, 2022

(51) Int. Cl.
    G01N 21/95    (2006.01)
    G01S 13/89    (2006.01)
    G01P 5/02     (2006.01)

(52) U.S. Cl.
    CPC .......... *G01N 21/9515* (2013.01); *G01S 13/89* (2013.01); *G01N 2021/9518* (2013.01); *G01P 5/02* (2013.01)

(58) Field of Classification Search
    CPC ........ G01N 21/9515; G01N 2021/9518; G01S 13/88; G01S 13/89; G01P 5/02
    See application file for complete search history.

(56) References Cited

U.S. PATENT DOCUMENTS

| 4,993,913 A * | 2/1991 | Ohtsuki ................ E04G 5/04 901/41 |
| 2007/0096727 A1 | 5/2007 | Rempt et al. |
| 2015/0226369 A1 * | 8/2015 | Troy ...................... G01N 29/28 901/1 |
| 2018/0361571 A1 * | 12/2018 | Georgeson .............. F41A 31/02 |
| 2019/0374966 A1 * | 12/2019 | Thompson ............. B05B 12/124 |
| 2020/0024853 A1 * | 1/2020 | Furrer ..................... E04F 21/22 |
| 2020/0025176 A1 | 1/2020 | Faotto |
| 2021/0180351 A1 * | 6/2021 | Lau ........................ B25J 9/0084 |

FOREIGN PATENT DOCUMENTS

KR    102012005 B1    8/2019

OTHER PUBLICATIONS

International Search Report and Written Opinion dated Nov. 3, 2021 which was issued in a counter part application PCT/US21/39037.

\* cited by examiner

*Primary Examiner* — Sang H Nguyen
(74) *Attorney, Agent, or Firm* — Buckley, Maschoff & Talwalkar LLC

(57) ABSTRACT

A frame body may be parallel to and proximate with a surface of a structure and extend substantially horizontally from a first side to a second side. At least one first connecting portion may be attached to a first cable to provide for vertical movement of the frame body, and at least one second connection portion may be attached to a second cable to limit undesired movement of the frame body and/or provide constant tension. At least one buffer portion may be located proximate the first side to move vertically on the surface, and at least one buffer portion may be located proximate the second side to move vertically on the surface. A surface imaging device attached to the frame body may let the system image a structure's substantially vertical surface (e.g., an optical camera may photograph an exterior wall of a building as the frame body is moved).

17 Claims, 31 Drawing Sheets

| SURFACE IMAGING SYSTEM IDENTIFIER 1502 | BUILDING IDENTIFIER 1504 | DATE (TIME) 1506 | OPERATOR IDENTIFIER 1508 | RECORDED MOVEMENTS 1510 |
|---|---|---|---|---|
| SIS_10001 | B_101 | 7/15/2024 (14:45:40) | O_101 | |
| SIS_10001 | B_101 | 7/16/2024 (13:02:28) | O_102 | |
| SIS_10003 | B_102 | 7/18/2024 (08:28:32) | O_101 | |

ROBOTIC SYSTEMS AND METHODS FOR SURFACE IMAGING OF STRUCTURE'S VERTICAL SURFACE

TECHNICAL FIELD

Some embodiments are directed to inspection-related surface imaging of surfaces of a structure, including windows, crevices, ledges, and similar structural and/or architectural surface elements. In particular, embodiments disclose robotic systems and methods for imaging a structure's substantially vertical surfaces.

BACKGROUND

The surfaces of any man-made structure will need periodic inspection with respect to their facades, facade cavities, and/or outer structural elements; surface imaging and/or scanning can assist with this inspection. For example, the vertical walls of a multi-story office building may need to be periodically inspected looking for cracks or other defects that may exist on or immediately beneath the surface (e.g., to prevent costly and/or hazardous damage that can result when undetected flaws are not corrected in a timely manner). In some cases, a human operator will use a harness and/or a movable scaffold (e.g., a suspended cradle attached to cables, also referred to as a Building Maintenance Unit ("BMU") or gondola) to manually access and record a surface image of the building. Such an approach, however, may be associated with substantial risk as the human worker may be injured (or killed) and human error may result in property damage and/or delays. Such risks may increase because the work is physically difficult, and the judgement of a tired worker may become impaired. Moreover, a human inspector will have limited physical capabilities (e.g., reach, visual clarity, field of view, etc.) and may be unable to work in even mildly difficult weather (e.g., wind, rain, fog, snow, etc.). Human approaches are also time consuming and equipment-intensive in both preparation and execution.

In some cases, propelled or otherwise aerial drones may be used to access hard to reach areas, but their utility may be limited (e.g., due to weather). These systems are also limited in their load bearing capacity and resilience to external factors (e.g., wind). Additionally, it is generally difficult for human operators to take stable, high quality images to review and corroborate their findings themselves or using existing robots and/or drones. A need, therefore, exists for improved systems and methods to inspect substantially vertical surfaces of structures.

SUMMARY

According to some embodiments, a frame body may be parallel to and proximate with a surface of a structure and extend substantially horizontally from a first side to a second side. At least one first connecting portion may be attached to a first cable to provide for vertical movement of the frame body, and at least one second connection portion may be attached to a second cable to limit undesired movement of the frame body and/or provide constant tension. At least one buffer portion may be located proximate the first side to move vertically on the surface, and at least one buffer portion may be located proximate the second side to move vertically on the surface. A surface imaging device attached to the frame body may let the system image a structure's substantially vertical surface (e.g., an optical camera may photograph an exterior wall of a building as the frame body is moved). In some embodiments, these cameras may be moved or rotated either directly individually or by rotation of the entire robotic frame about its axis. The former may be achieved by motors, actuators, or loaded springs. The later might be achieved by activated brakes in the buffer portion, harmonically starting and stopping the linear movement of the angularly asymmetric body, or by varying downward tension on a secondary line (or any combination thereof).

Some embodiments comprise: means for placing a surface imaging system proximate to the surface, the surface imaging system having a frame body parallel to and proximate with the surface and extending substantially horizontally from a first side to a second side; means for moving the surface imaging system vertically via at least one first connecting portion adapted to be attached to a first cable to provide for vertical movement of the frame body, wherein: (i) at least one second connection portion is attached to a second cable to limit undesired movement of the frame body and/or provide constant tension, (ii) at least one buffer portion located proximate the first side to move vertically on the surface, and (iii) at least one buffer portion located proximate the second side to move vertically on the surface; and means for performing surface imaging of the surface with a surface imaging device attached to the frame body.

Some technical advantages of some embodiments disclosed herein are improved systems and methods for imaging a structure's substantially vertical surfaces.

BRIEF DESCRIPTION OF THE DRAWINGS

FIG. 15 is a surface imaging database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention relates to a new and useful robotic system to inspect a surface of a "structure," such as a skyscraper. As used herein, the term "structure" might refer to a building, a multi-story building, an office building, a warehouse, a stadium, a wall, a bridge, a monument, a dam, an apartment building, an airport structure (e.g., a control tower), a man-made structure with at least 10,000 square feet of exterior surfaces, etc. Moreover, the phrase "surface" might be associated with a wall, window, ledge, crevice, or other structural element made of masonry, brick, stone, steel, concrete, cement, iron and alloys, terracotta, metal, glass, etc.

Figure 1A:
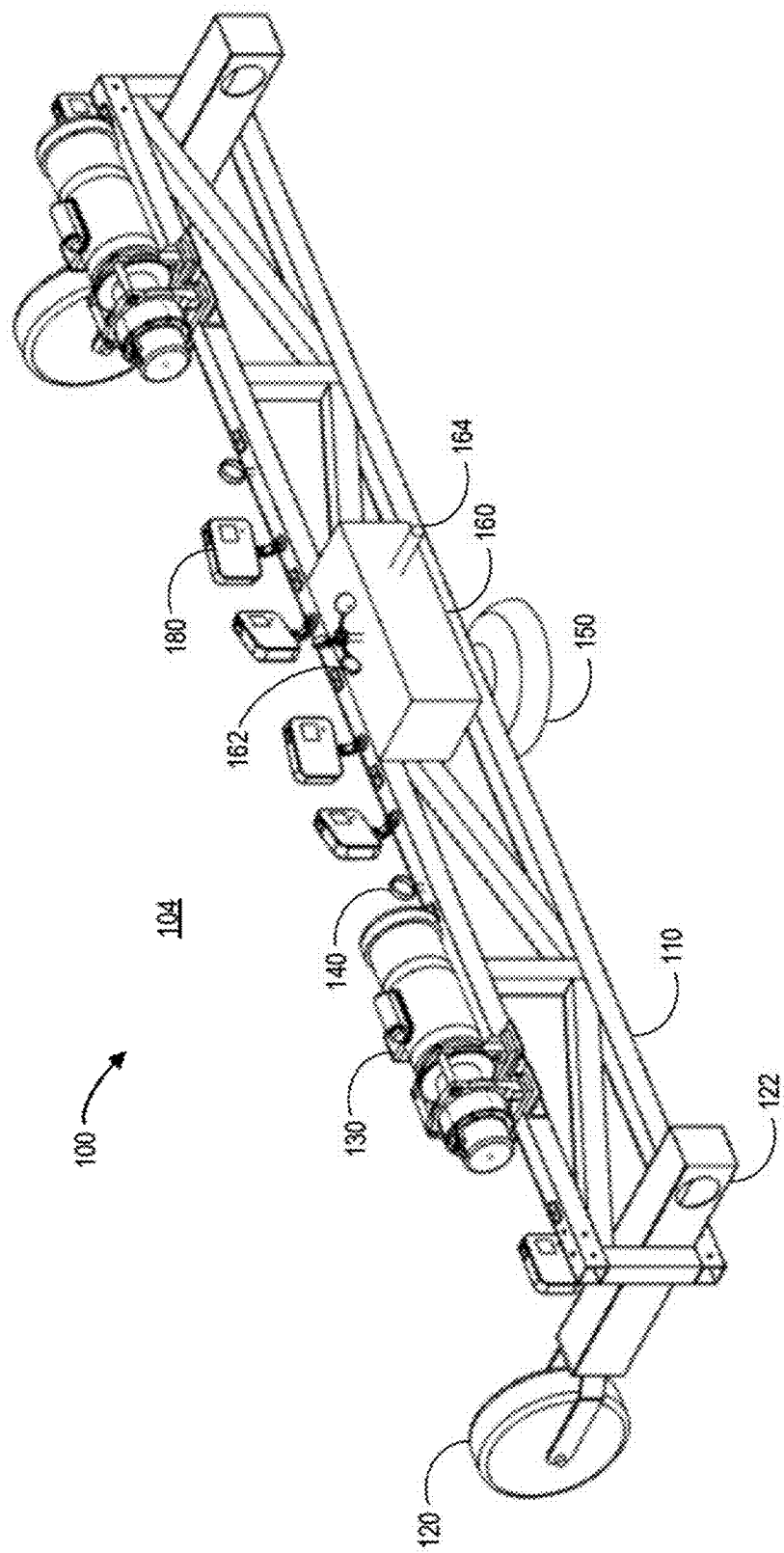
FIGS. 1A through 1C show a surface imaging system according to some embodiments.
Figure 1B:
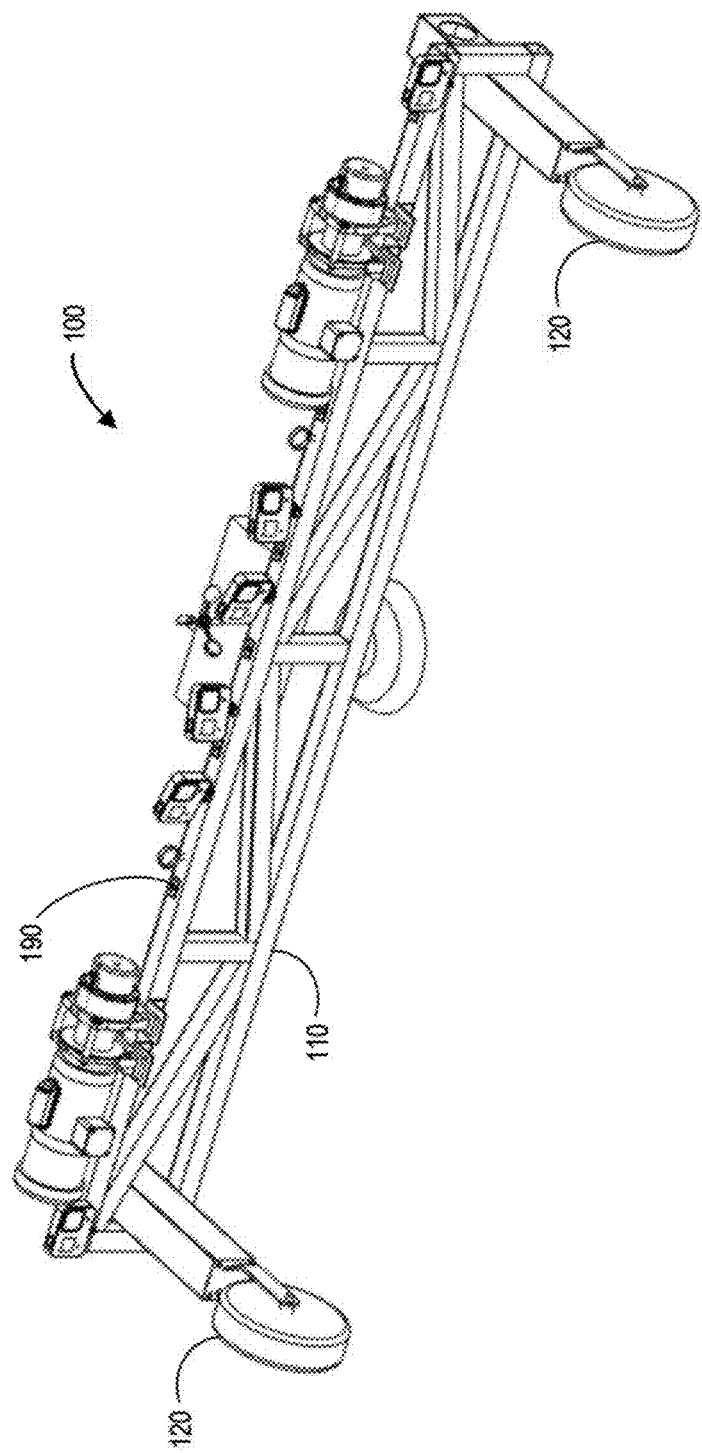
Figure 1C:
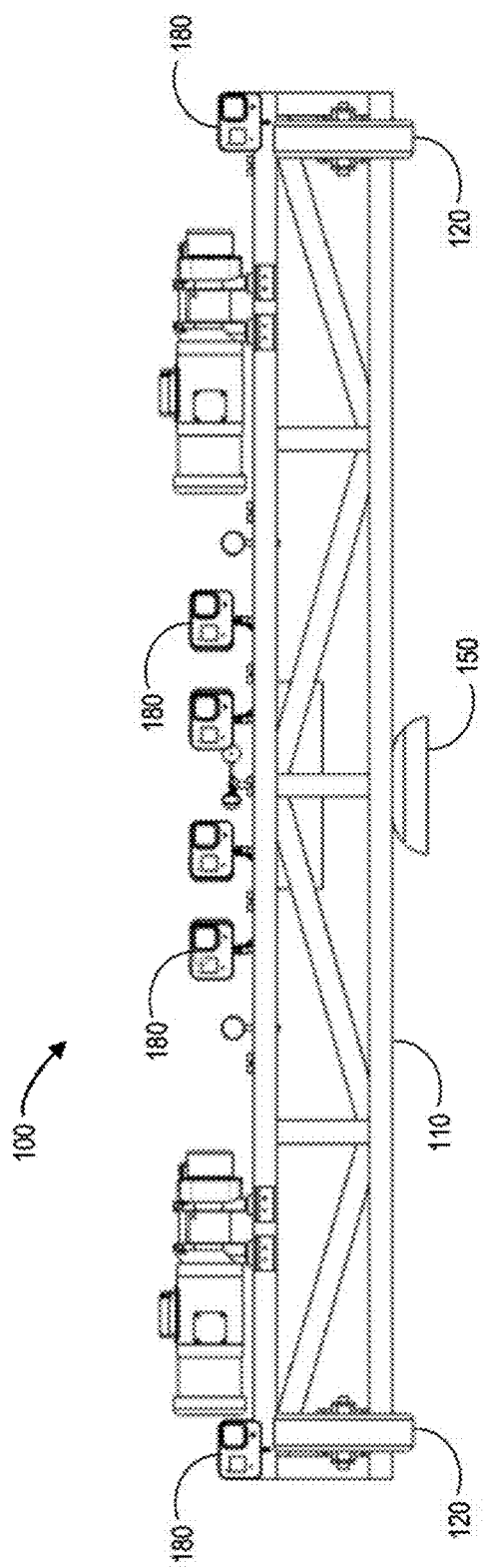

FIGS. 1A through 1C illustrate 100 a surface 104 (e.g., a wall) of a structure (e.g., a multi-story office building). As shown, a surface imaging system 100 may include a frame body 110 according to some embodiments. The frame body 110 may be parallel to and proximate with the surface 104 and extend substantially horizontally from a first side to a second side. The frame body 110 may be attached to a buffer element including a buffer portion 120 (e.g., wheel) and buffer arm 122. As used herein, the phrase "surface imaging" might refer to an optical camera, a video camera, an infrared camera, a laser-based scanner, a radar-based imaging device, etc.

In some embodiments, a first set of one or more buffer portions 120 (e.g., wheels 120 and buffer connection portions 122 which may be attached to the frame body 110) may be located proximate to a first side to move vertically on the surface 104, and a second set of buffer portions may be located proximate to a second side to move vertically on the surface 104. Note that more than two sets of buffer portions may be employed. The first and second sets of buffer portions may, in some embodiments, comprise of wheels and/or absorb and distribute impulse via mechanical dampeners or wheels. Note that the buffer portion might comprise wheels that roll on the surface 104 or a flat, low-friction foam that slides over the surface 104 or may include either not typically in contact with the structure.

The surface imaging system 100 may further include rotary hoist motors 130, connector hooks 140, a ground communication disc 150 (e.g., to determine how close the surface imagine system is to ground), a control box 160 (with an anemometer 162, (e.g., to measure weather conditions) and an antenna 164) and/or surface imaging devices 180 (e.g., optical cameras, etc.). According to some embodiments additional sensors 190, such as modular electronics and sensors, internal wiring and antennas, mechanical dampeners (optional), a range-finding reflective dish, a gyroscope, the anemometer 162, dynamic speed brakes, and/or an airbag may also be employed.

Figure 2A:
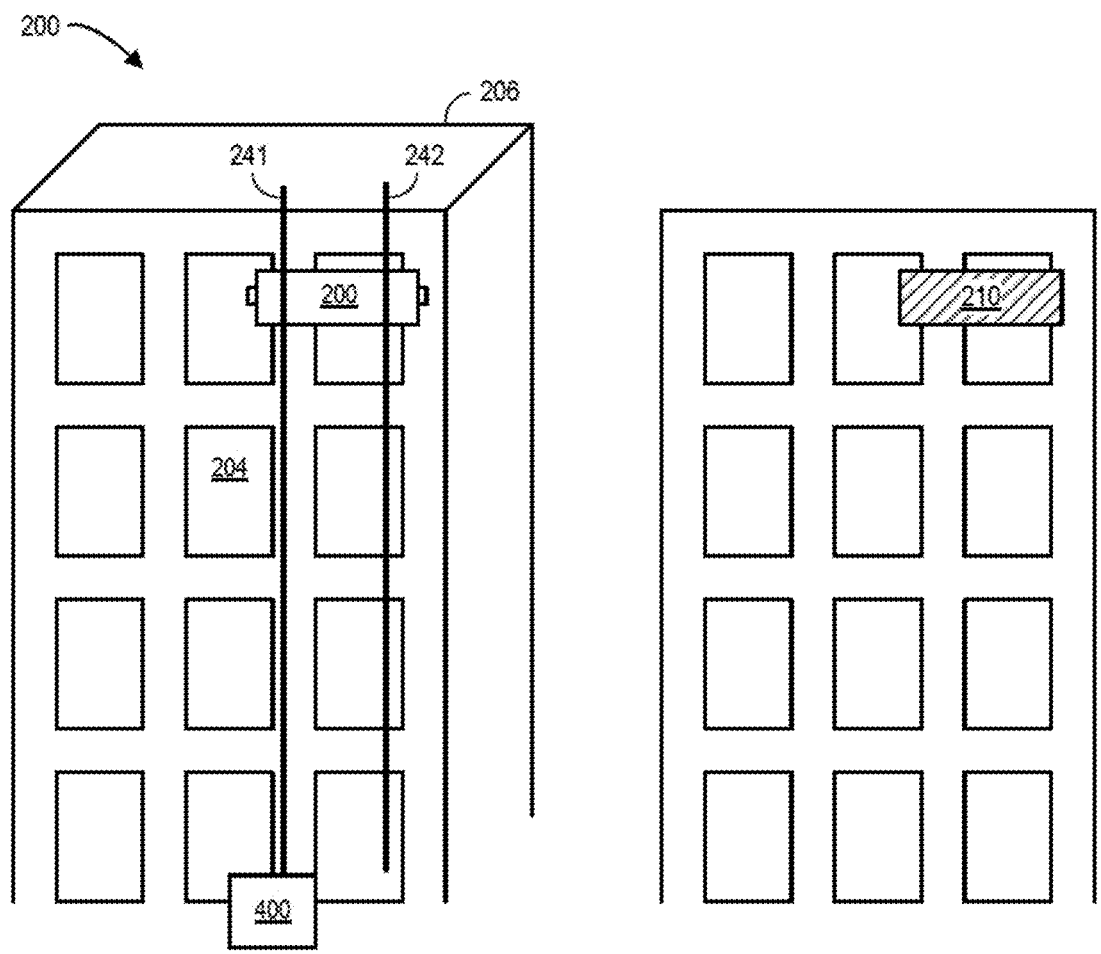
FIGS. 2A and 2B illustrate motion of a surface imaging system in accordance with some embodiments.
Figure 2B:
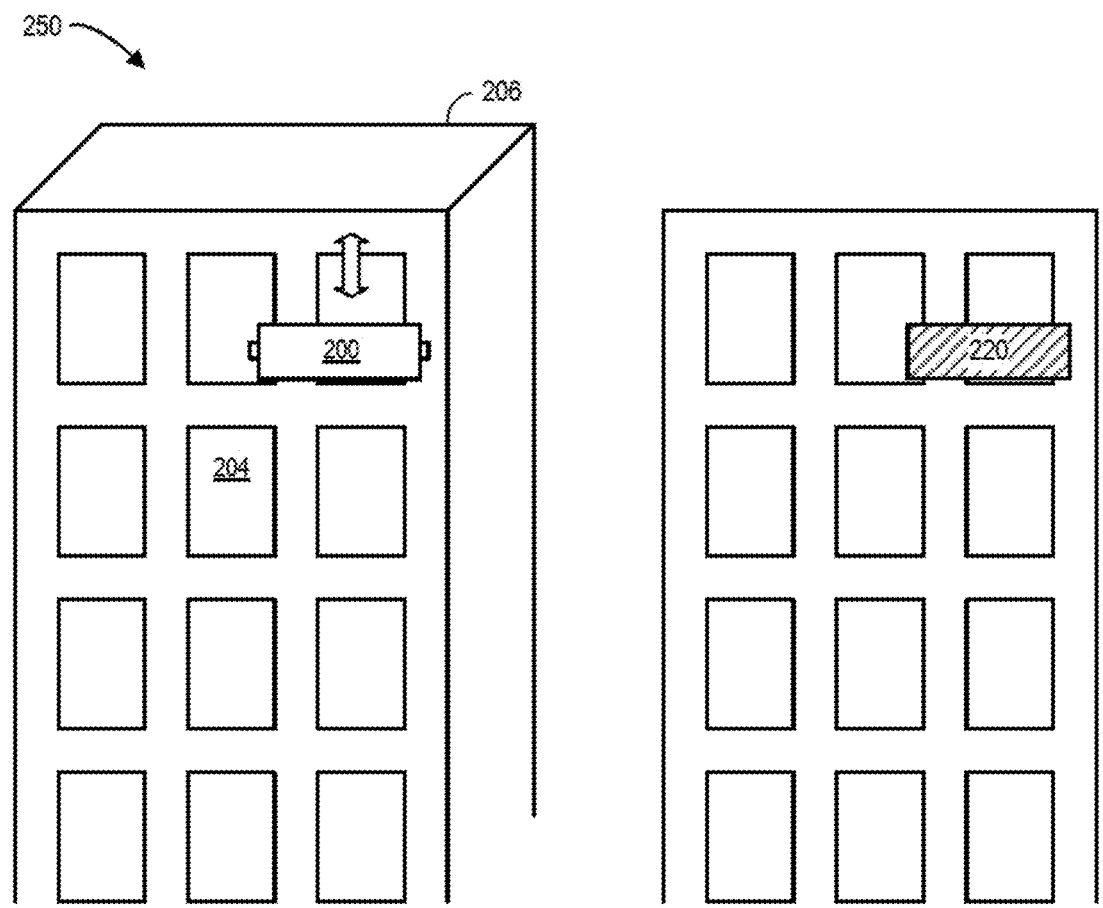

FIGS. 2A and 2B illustrate motion of a surface imaging system in accordance with some embodiments. As shown 200 in FIG. 2A, a surface imaging system 200 is placed proximate to a surface 204 of a structure 206. The system may include at least one first connecting portion to be attached to a first cable 241 (e.g., attached to ground via cart 400) to provide for vertical movement of the frame body. Moreover, the illustration 200 show at least one second connection portion to be attached to a second cable to limit undesired movement of the frame body and/or provide constant tension per the capacity of each individual structure. The resulting area 210 imaged is shown by cross-hatching in FIG. 2A. After the area is inspected, FIG. 2B shows 250 that the surface imaging system 200 has been lowered down the surface 204 of the structure 206 (as illustrated by the arrow in FIG. 2B). The resulting area 220 inspected is again shown by cross-hatching in FIG. 2B.

Figure 3:
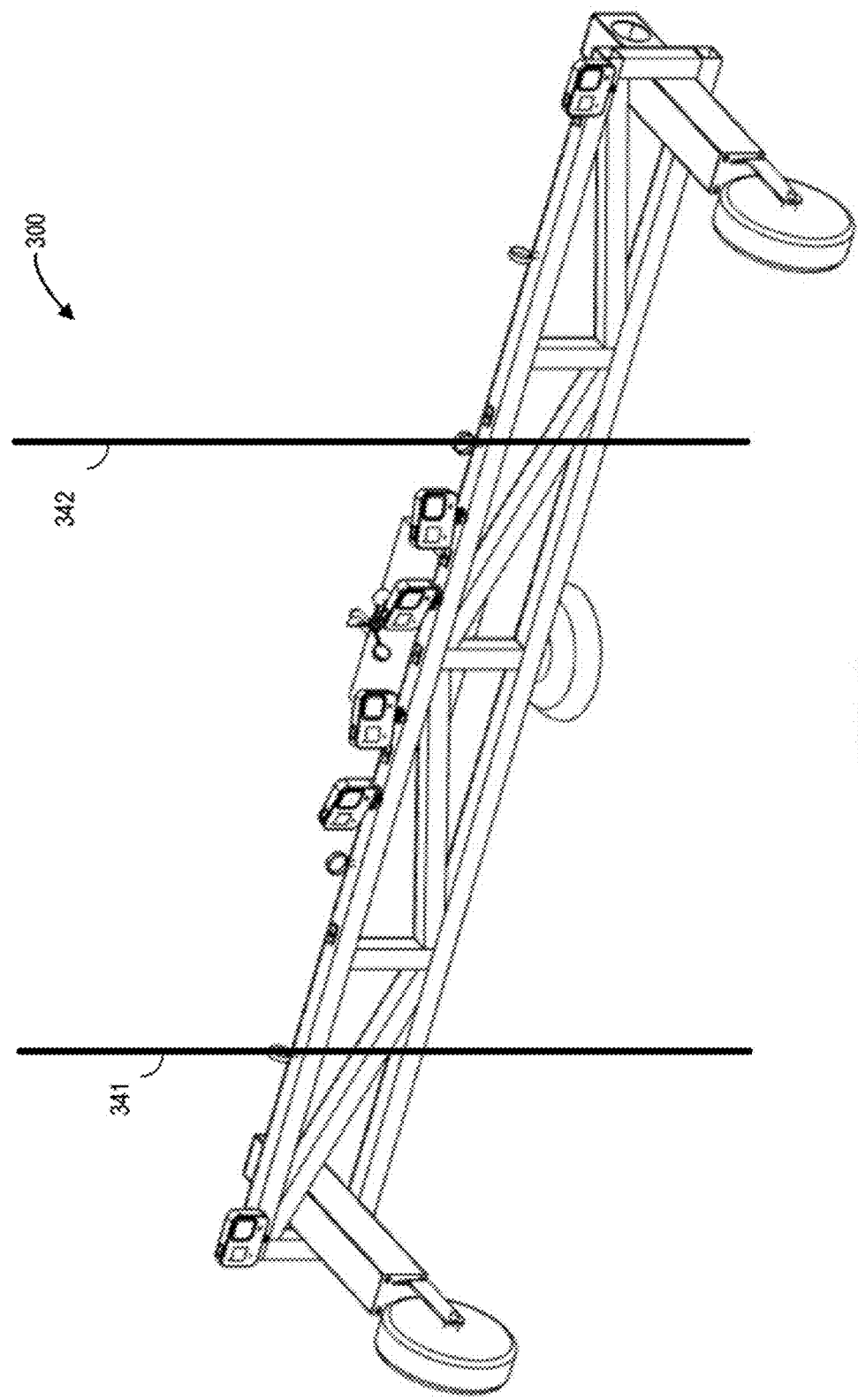
FIG. 3 illustrates connections to a surface imaging system according to some embodiments.

The surface imaging system 200 may be moved up and/or down the structure 206 using cables. For example, at least one connecting portion on the frame body may be adapted to be attached to a cable to provide for vertical movement of the frame body. FIG. 3 illustrates 300 connections to a surface imaging system according to some embodiments. Several hooks 340 attached to a frame body 310 may be attached to cables 341, 342. Although several hooks 340 are shown in FIG. 3, any number of such connecting portions may be provided (and might be positioned to be similar to connecting portions of conventional platforms, such as those used for surface washing). In some embodiments, at least one first connecting portion is attached to a first cable 341 to provide for vertical movement of the frame body while at least one second connection portion is attached to a second cable 342 to limit undesired movement of the frame body and/or provide constant tension. According to some embodiments, at least one connecting portion attaches to the cables 341, 342 via tethering latches and rigs.

Note that in some embodiments, a frame can be lifted by hoists on the ground, on the roof, and/or on the rig itself, that is embodiments may have the modularity to adapt any method on the site itself. Moreover, the frame can latch on to the same line multiple times (typically twice) to allow for greater stability against external forces as well as faster controlled descents. That is, the roof clamp and hoist mechanism on the ground can maintain constant tension between one another over the course of a descent, improving safety. The hoist mechanism on the ground can be anchored in place mechanically or rely on its own weight for stability. The frame can, in some embodiments, have two external lines which can be tensioned to tether in place or accelerate descent; these lines can be used to also provide electricity or an independent electrical line can also be run. Moreover, the frame may have folding arms on either end which provide additional span at very low cost of weight and a roof clamp may have a tensioning device which can be adjusted per each building's load capacity. Various hoists can run a looped line so that it can pull up as well as pull down under constant tension and the aerodynamics of the robot might be such that travel upwards and downwards causes wind shear which mitigates the effects of external winds. In some embodiments a separate drag shield or spoiler may be employed to further direct wind shear.

Figure 4A:
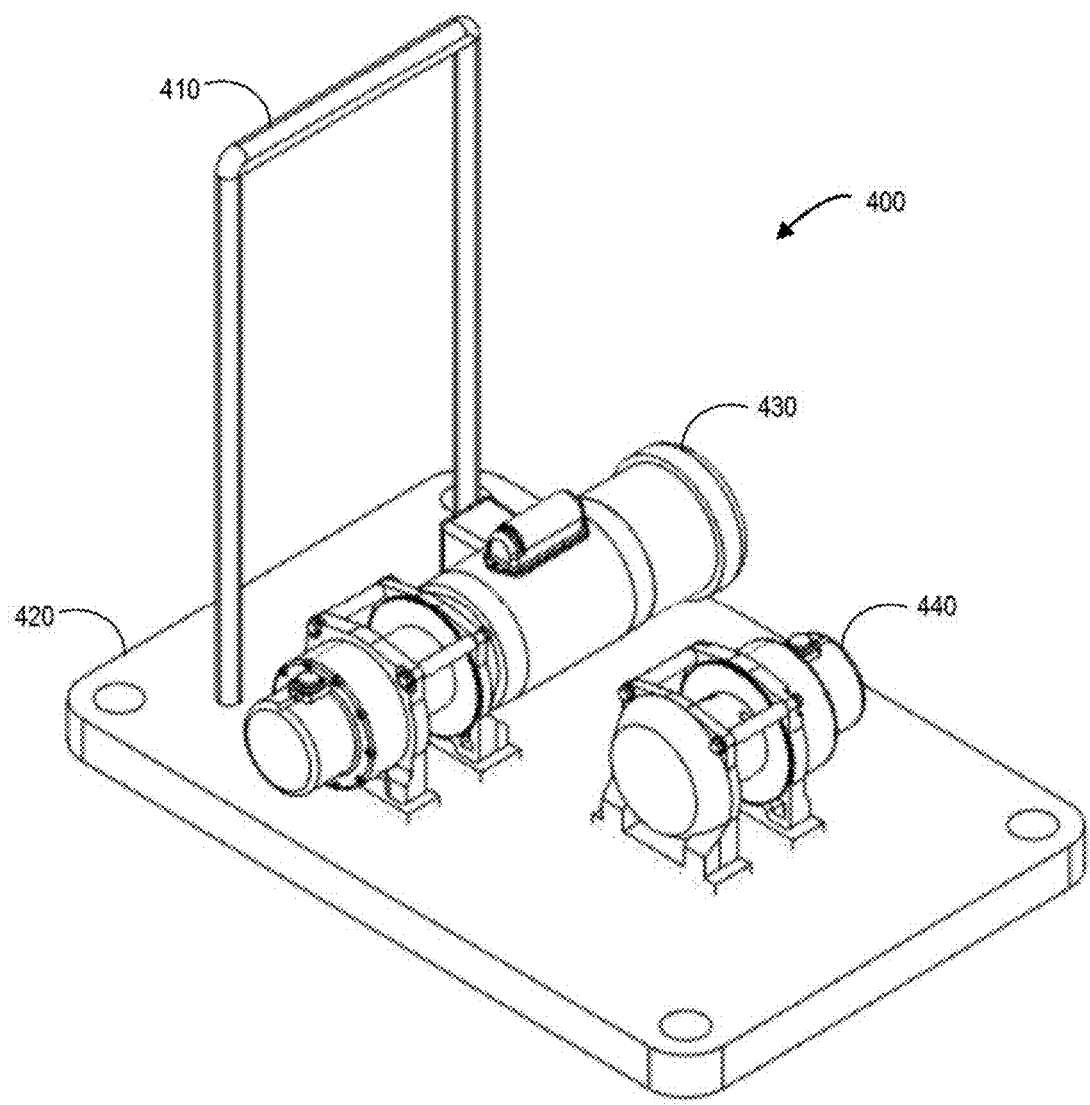
FIGS. 4A through 4C are associated with carts that may be provided in accordance with some embodiments.
Figure 4B:
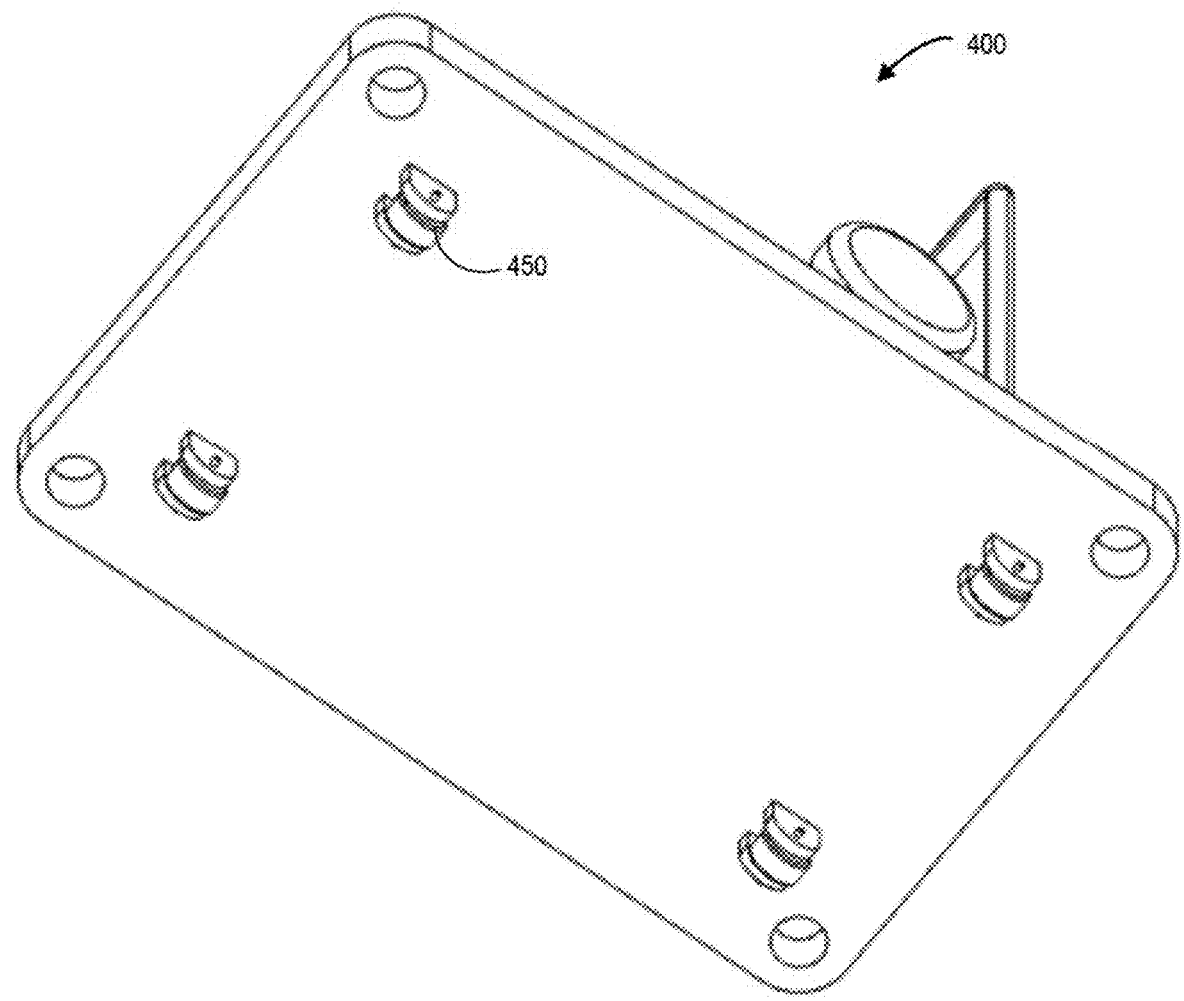
Figure 4C:
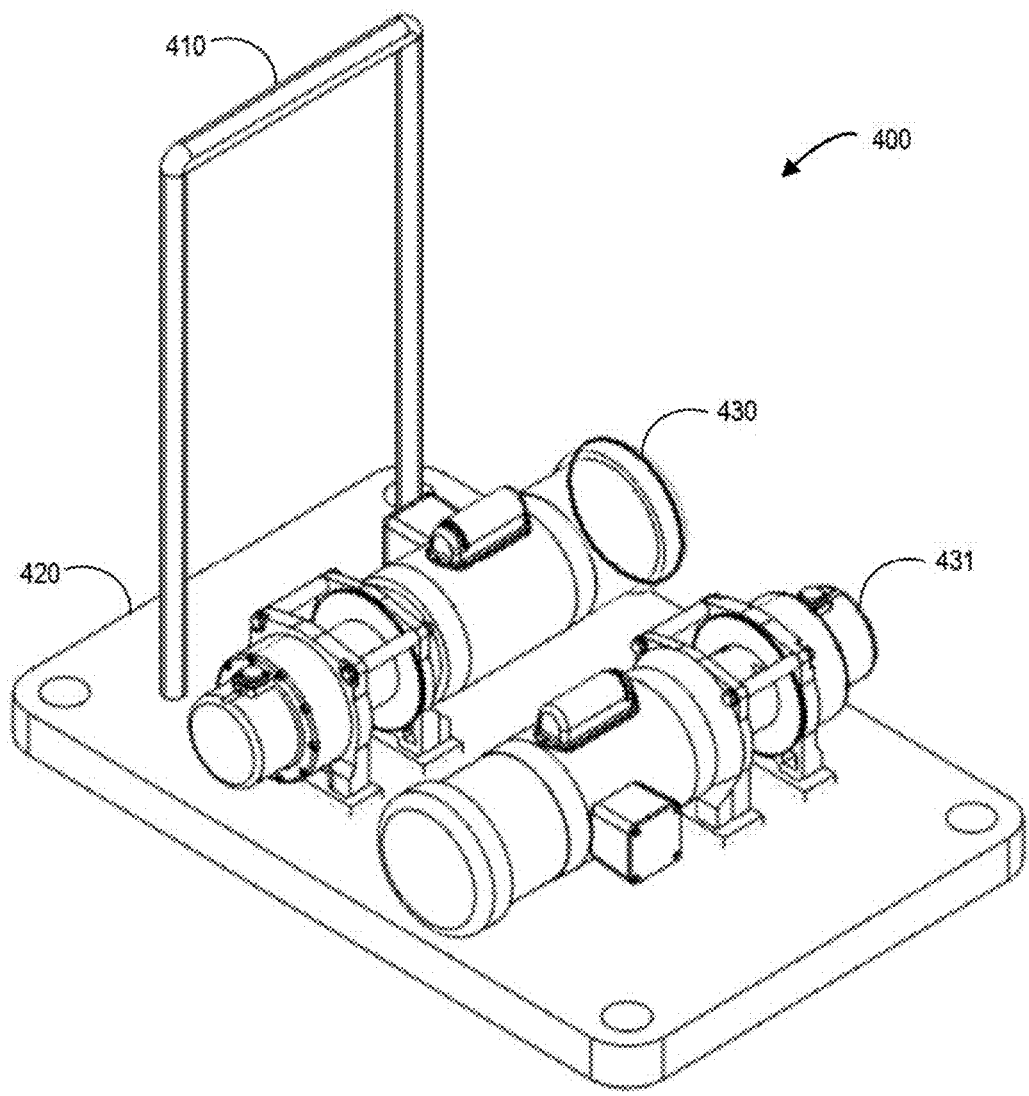

FIGS. 4A through 4C illustrate "carts" that may be used to provide and support systems in accordance with some embodiments. In particular, FIGS. 4A and 4B show a cart 400 with a handle 410 and a base 420 attached to a motor hoist 430 and a spool 440. The underside of the cart in FIG. 4B show the wheels 450 that might be used to move the cart. The carts 400 might, for example carry two hoists motors 430, 431 (as illustrated in FIG. 4C) or one hoist and one drum. These will remain on the ground with one line used to provide constant tension between the roof and the ground and the other line used to move the robot up and down. These independent lines offer redundancy in the event of a primary line failure and minimize the degree to which the frame can move in any non-vertical direction. Tension sensors, one or more optional ground anchors, wheel brakes, etc. may also be employed.

Figure 5A:
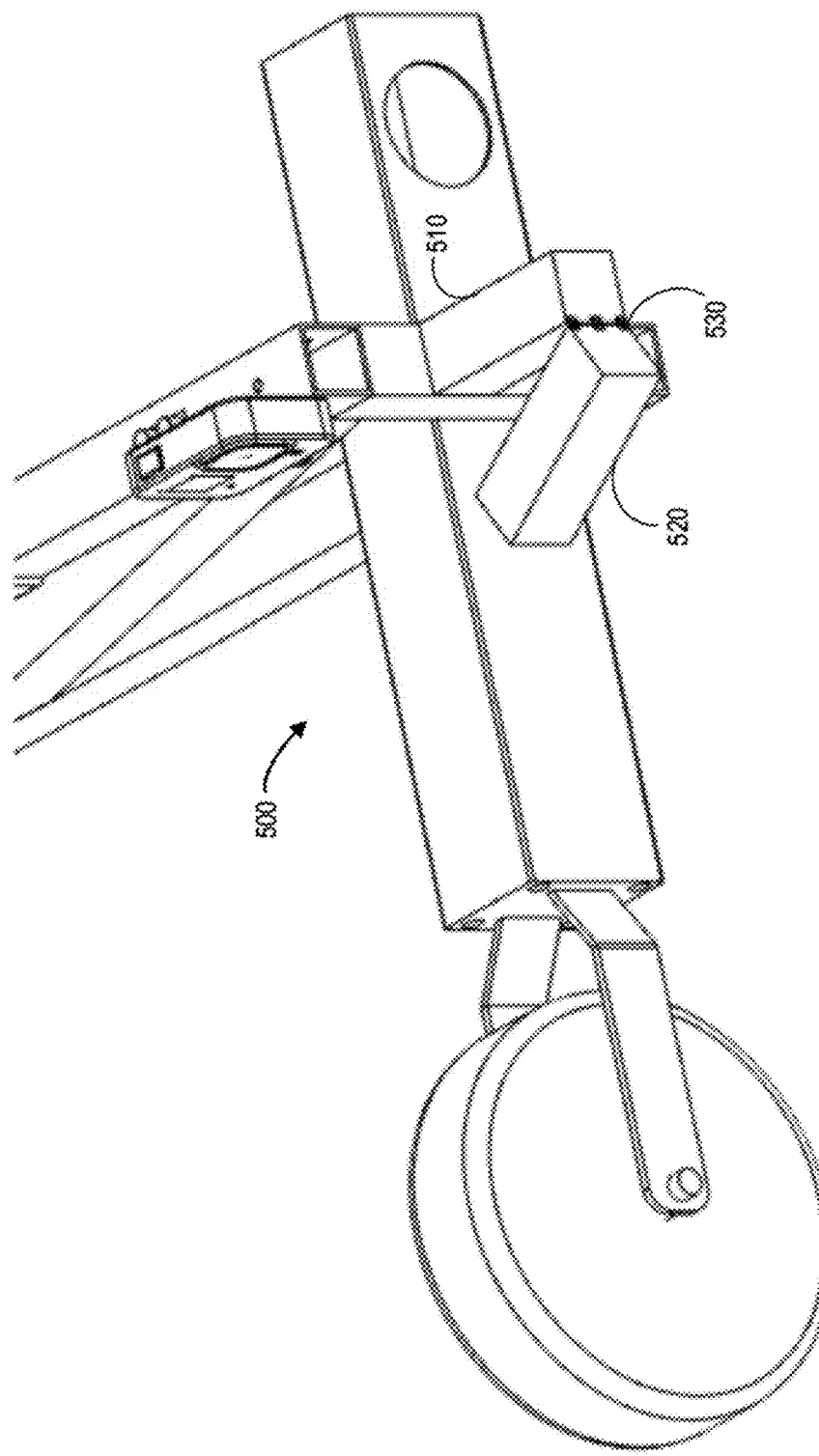
FIGS. 5A and 5B show a frame with folding arms that may be provided according to some embodiments.
Figure 5B:
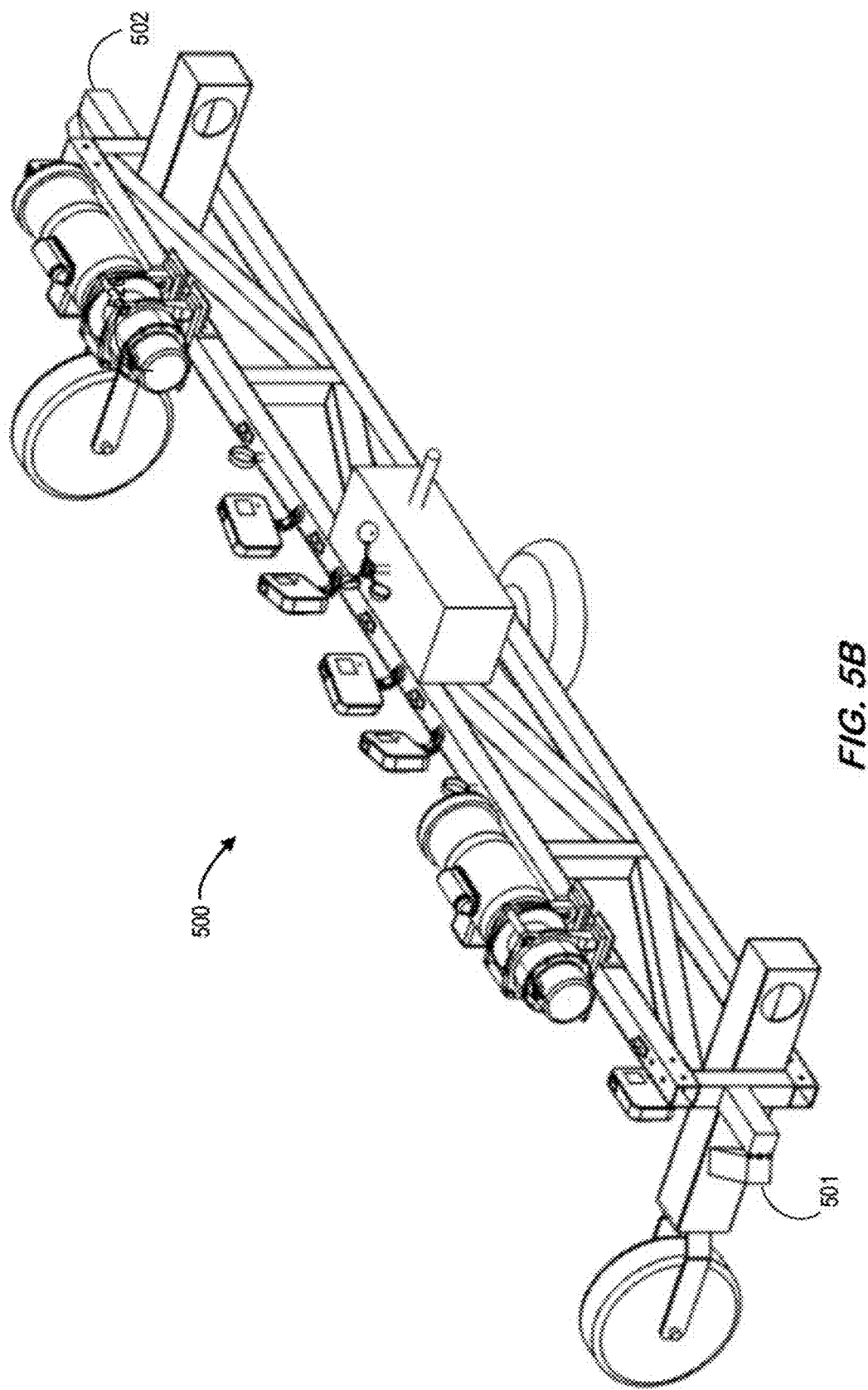

FIGS. 5A through 5B show a frame or rig 500 with expanding, folding arms that may be provided according to some embodiments (e.g., to hold one or more additional cameras to increase the span of imaging capabilities). As shown in the zoomed-in view of FIG. 5A, the frame 500 may include a folding arm or wing with an attached portion 510 and an expanded portion 520 coupled via hinges 530. This might be, for example, a mechanical hinge 530 that extends a frame's horizontal dimension at very little cost of weight. The hinge 530 can be locked in place during use and transport and the folding arm can carry cameras or other electronics as needed. FIG. 5B shows a frame 500 with a folding arm 501, 502 at both ends of the rig.

Figure 6A:
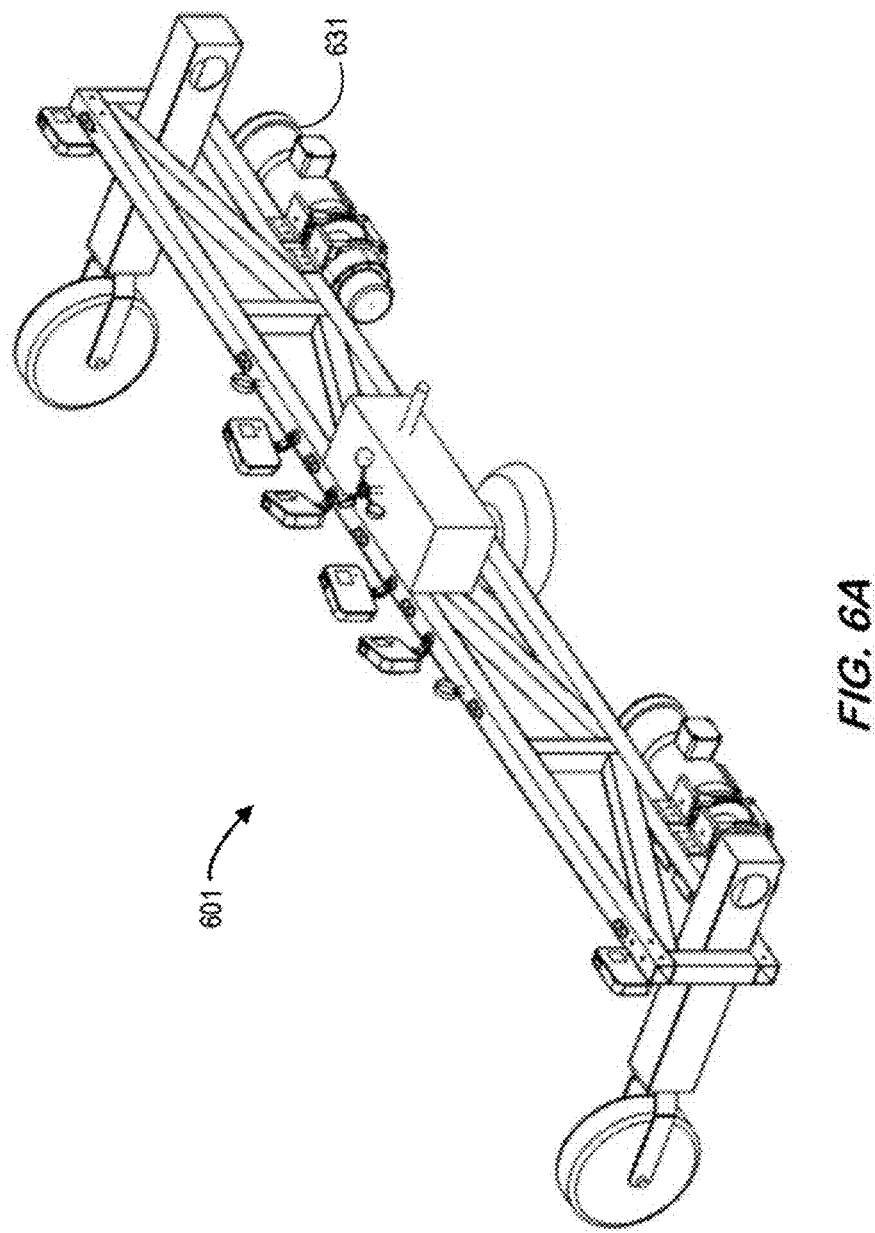
FIGS. 6A through 6D are hoist variations that may be provided in accordance with some embodiments.
Figure 6B:
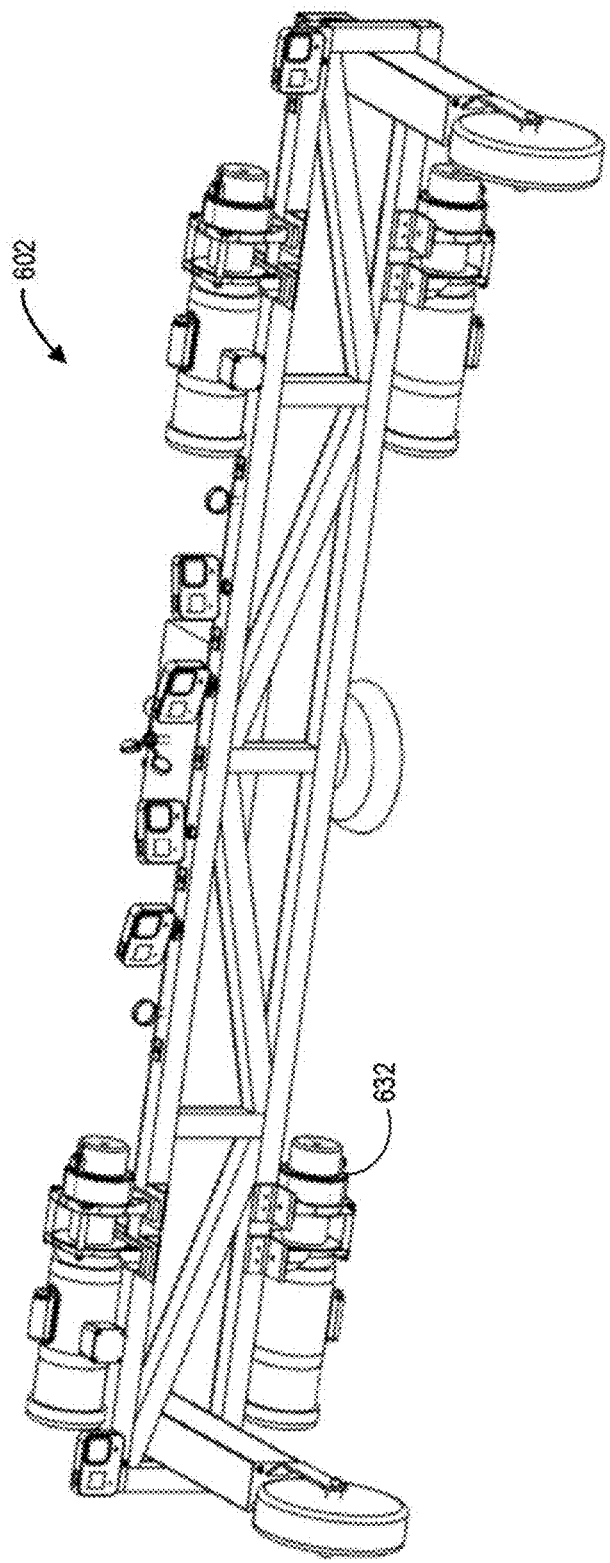
Figure 6C:
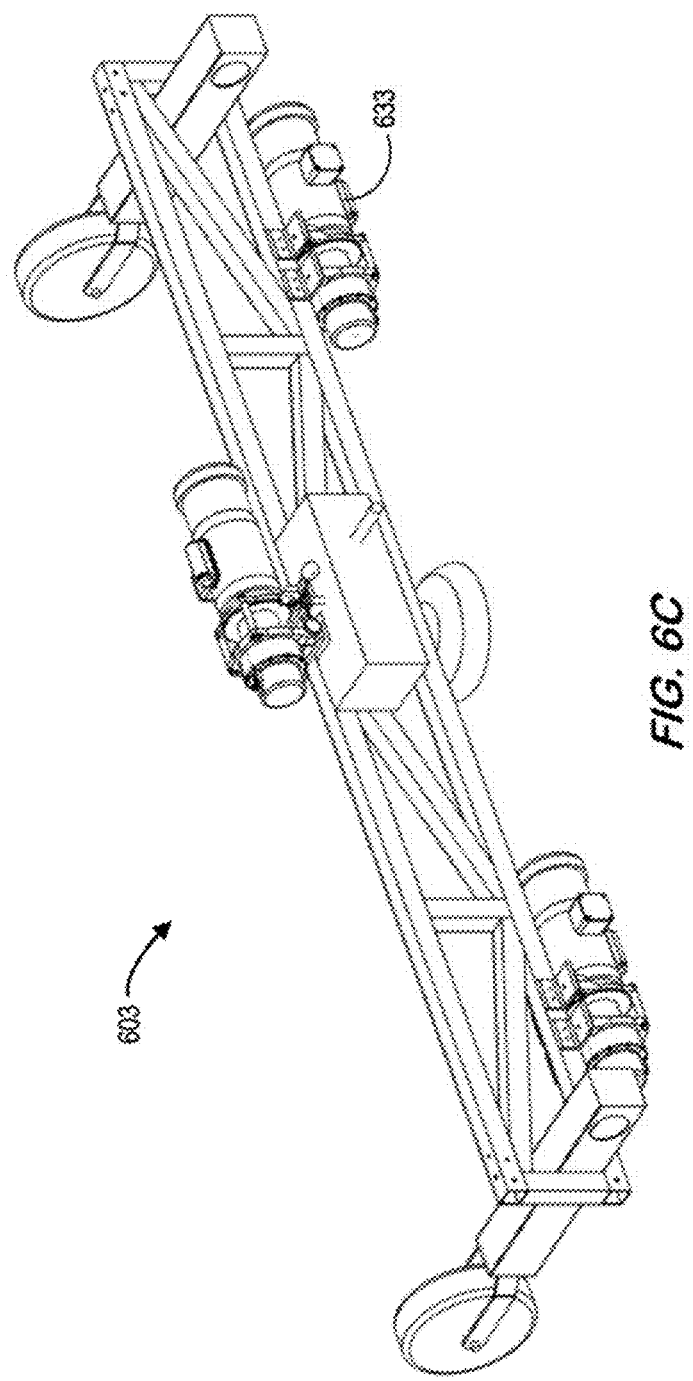
Figure 6D:
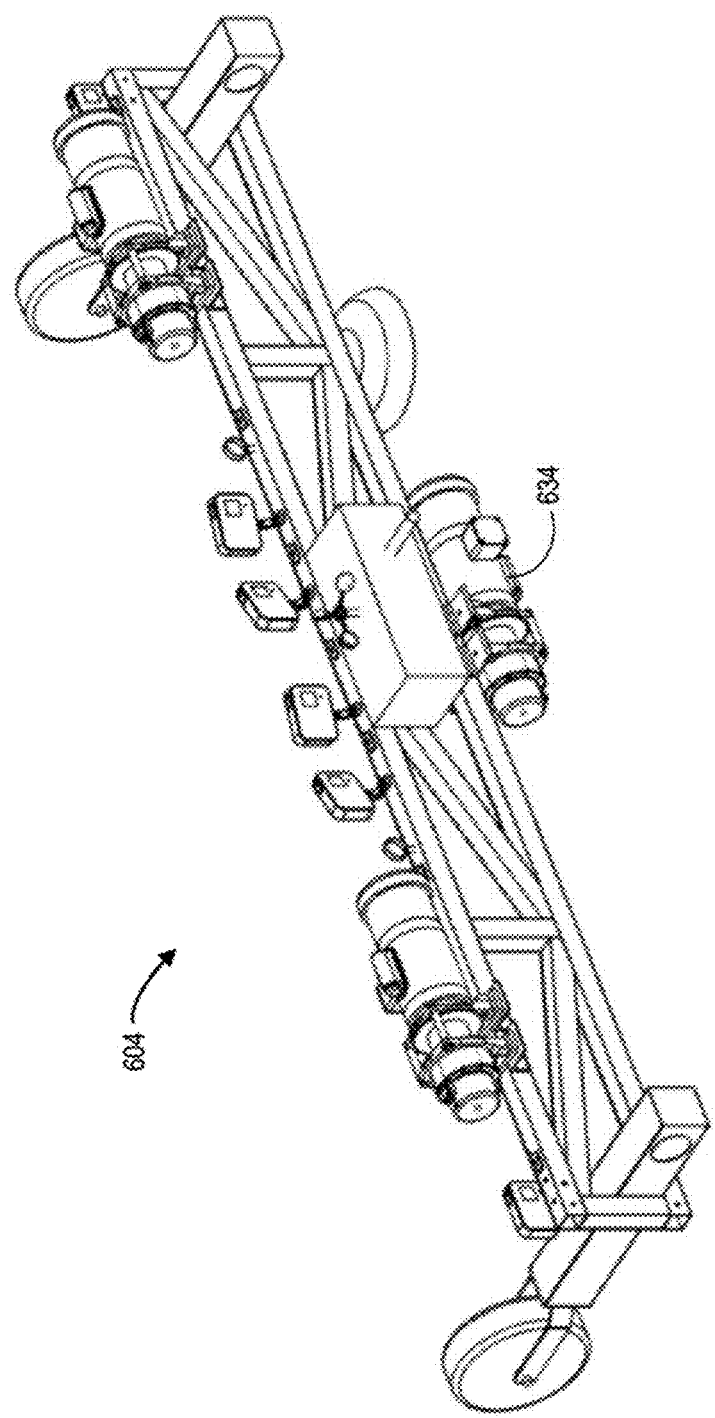
Figure 7A:
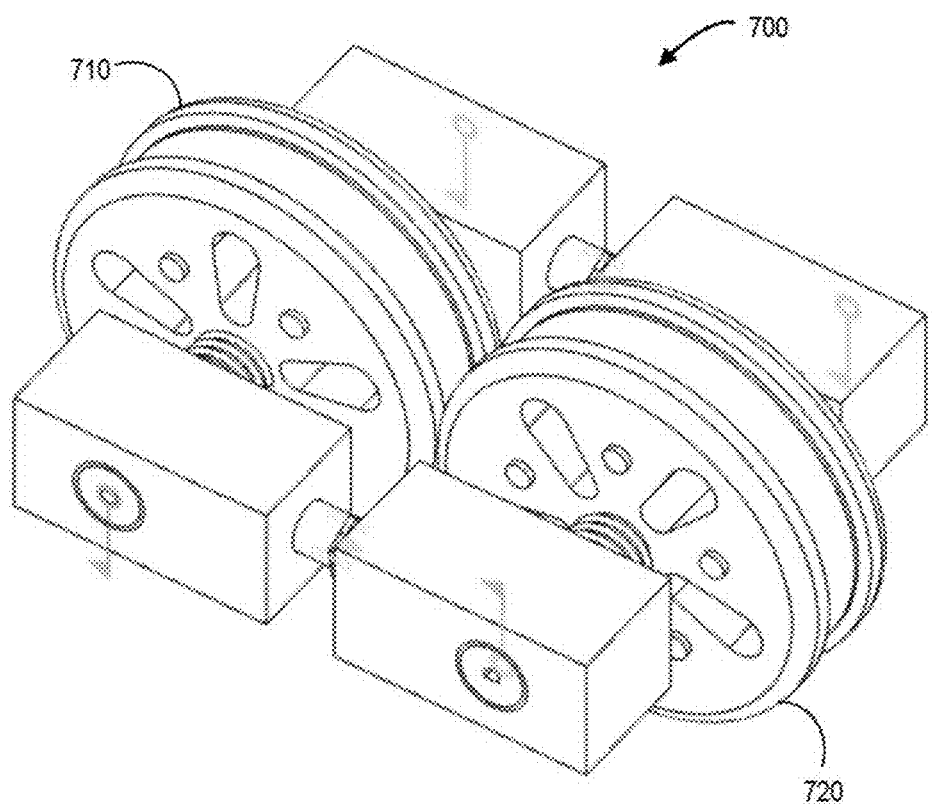
FIGS. 7A through 7D illustrate a locking cable pulley that may be provided according to some embodiments.
Figure 7B:
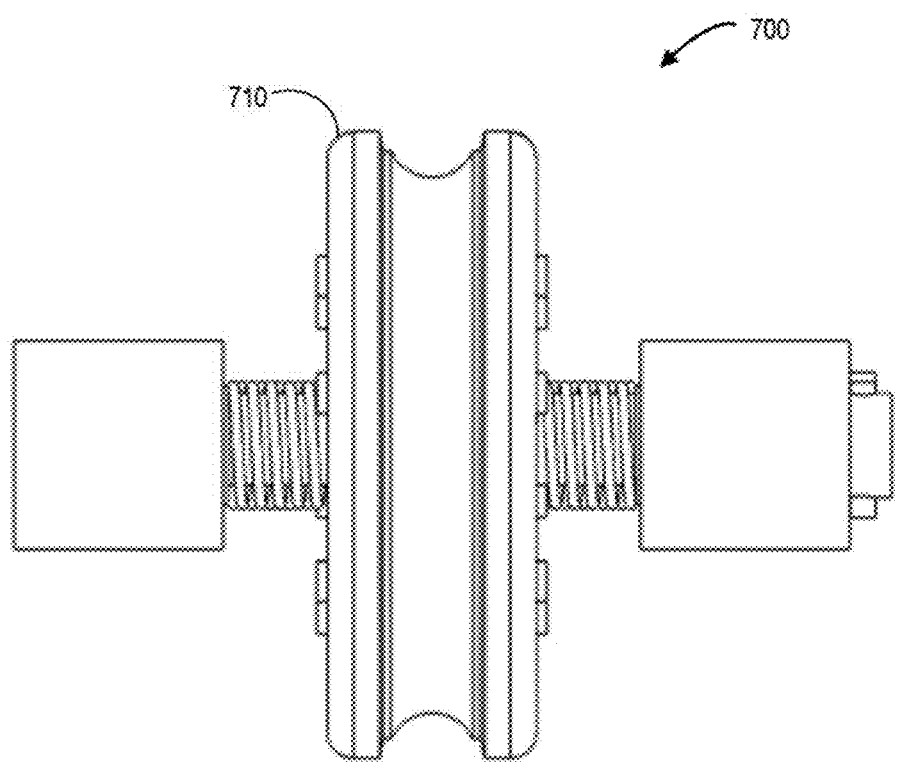
Figure 7C:
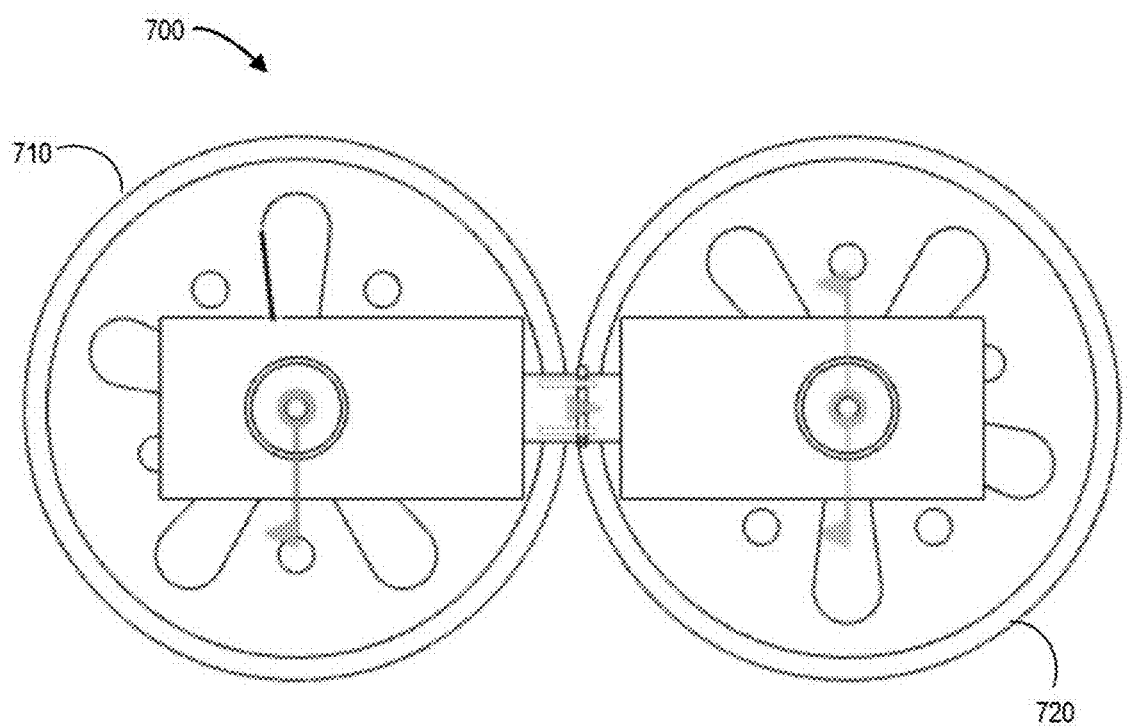
Figure 7D:
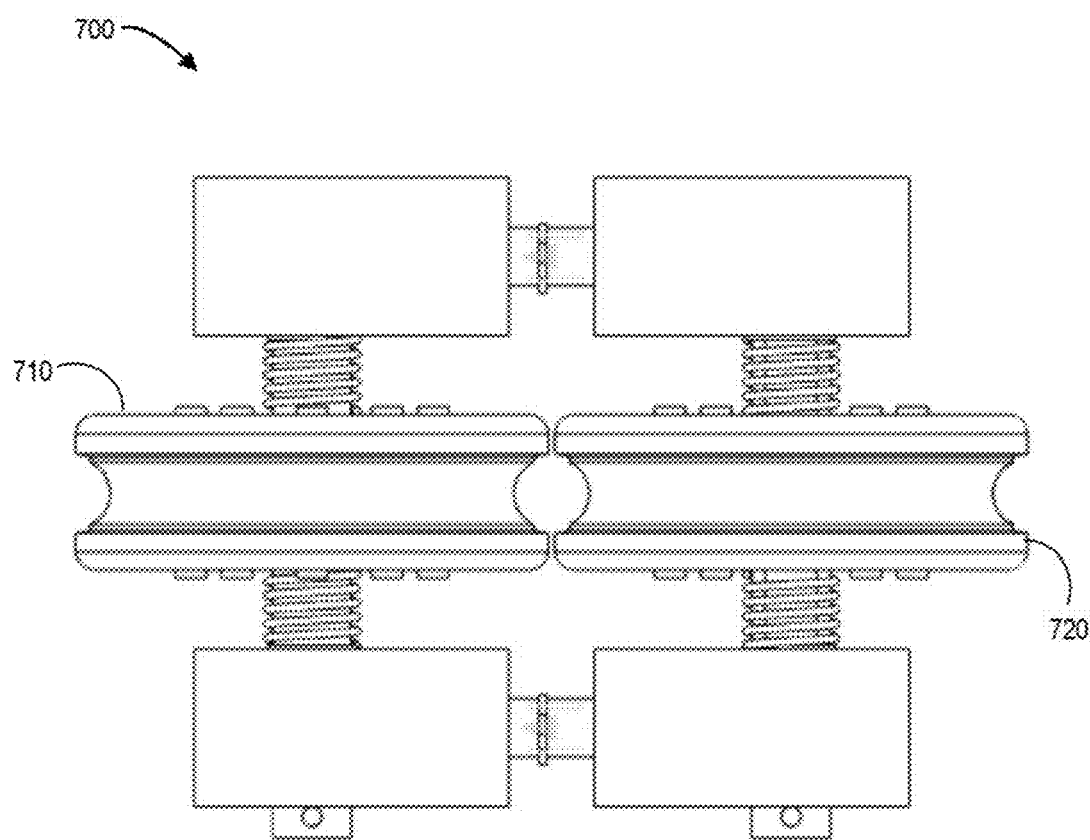
Figure 8A:
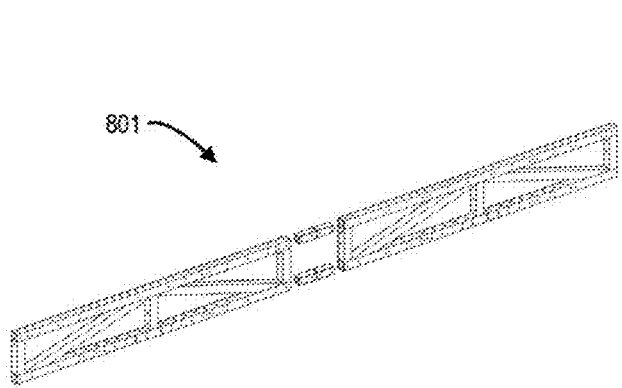
FIGS. 8A through 8D illustrate a modular frame that might be provided in accordance with some embodiments.
Figure 8B:
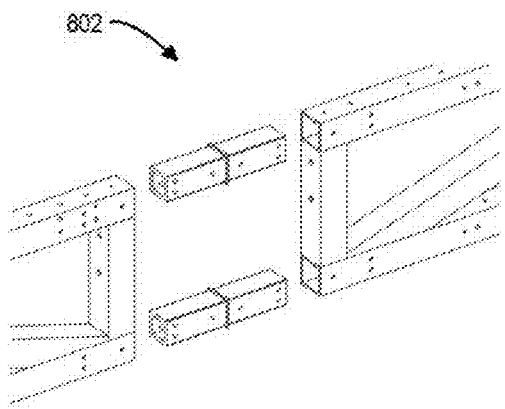
Figure 8C:
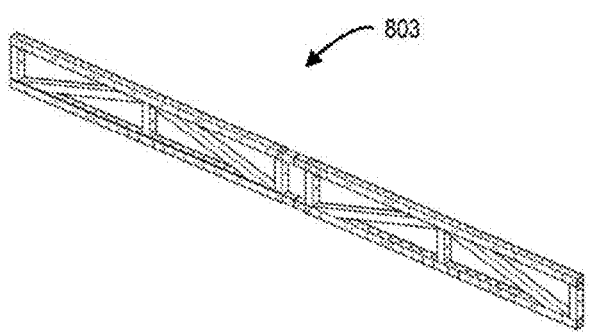
Figure 8D:
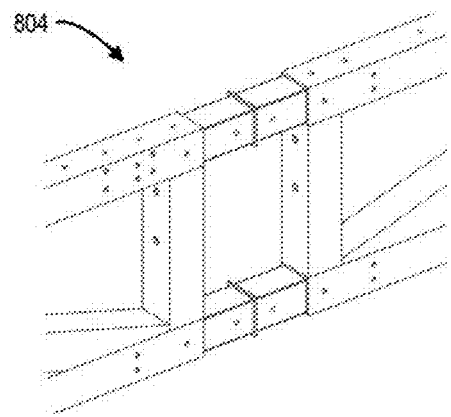

FIGS. 6A through 6D are hoist variations that may be provided in accordance with some embodiments. FIG. 3 showed, as one example, a frame without hoists. As other examples, consider that a robot can be operated with onboard hoists (for drops from the roof) or with hoists on the ground as discussed above (for drops from the ground). For example, FIG. 6A shows 601 two hoists 631 located lower on the frame, FIG. 6B shows 602 four hoists 632, FIG. 6C shows three frames 633 with one on top of the frame and two below, and FIG. 6D shows three frames 634 with two on top and on below. These variations may also allow for a range of tension stabilizing techniques and provide optimal torsion and pitch per building. In various embodiments, one or more rotary hoist motors might be mounted on the frame body, the ground proximate to, or the roof of the building to be imaged.

FIGS. 7A through 7D illustrate a locking cable pulley 700 with a first pulley 710 and a second pulley 720 that may be provided according to some embodiments. Such a locking cable pulley 700 may demonstrate how embodiments will be attached to the fixed tension line. For example, a robot may slide up and down the line, but cannot get too far away from it. There may also be an integrated lock to help clasp the fixed line and lock the robot in place when needed.

FIGS. 8A through 8D illustrate a modular frame that might be provided in accordance with some embodiments. Note that embodiments 801, 802, 803, 804 may easily attach any number of frames together. Moreover, hoists and dampeners can also be positioned easily at any point along the frame.

Figure 9A:
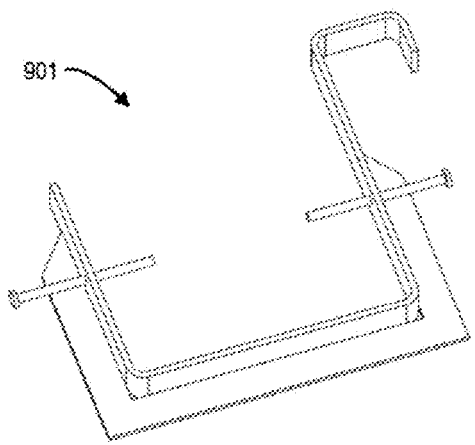
FIGS. 9A through 9G are roof clamps that might be provided according to various embodiments.
Figure 9B:
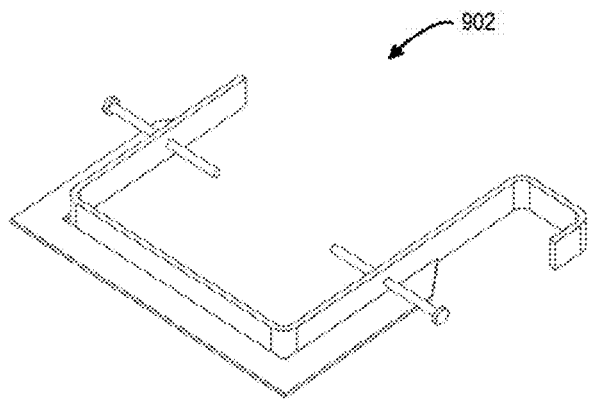
Figure 9C:
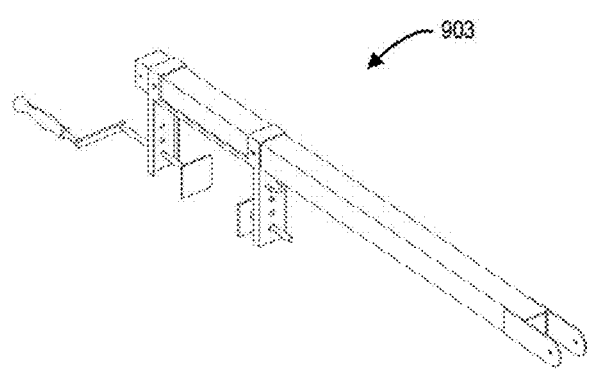
Figure 9D:
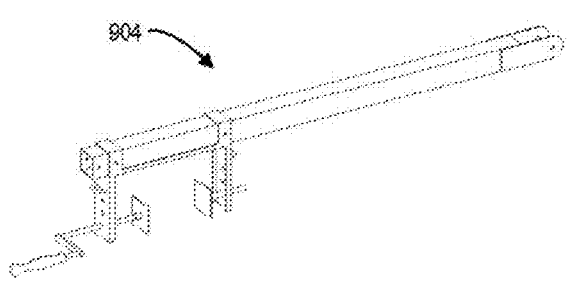
Figure 9E:
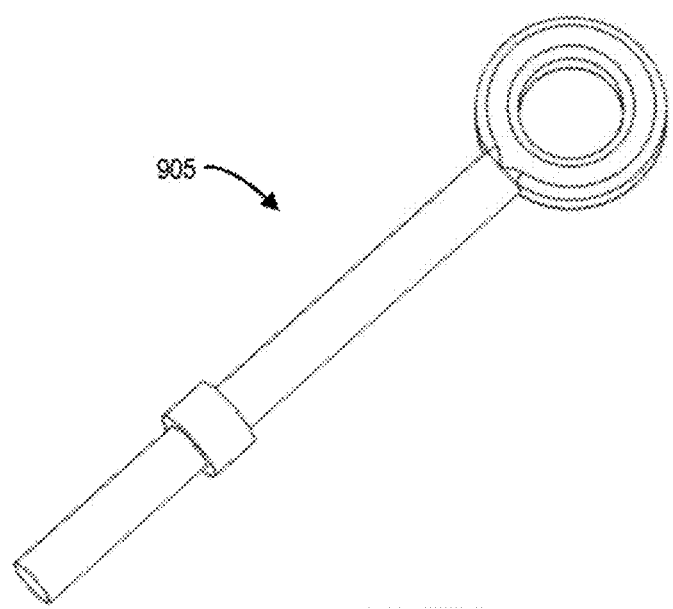
Figure 9F:
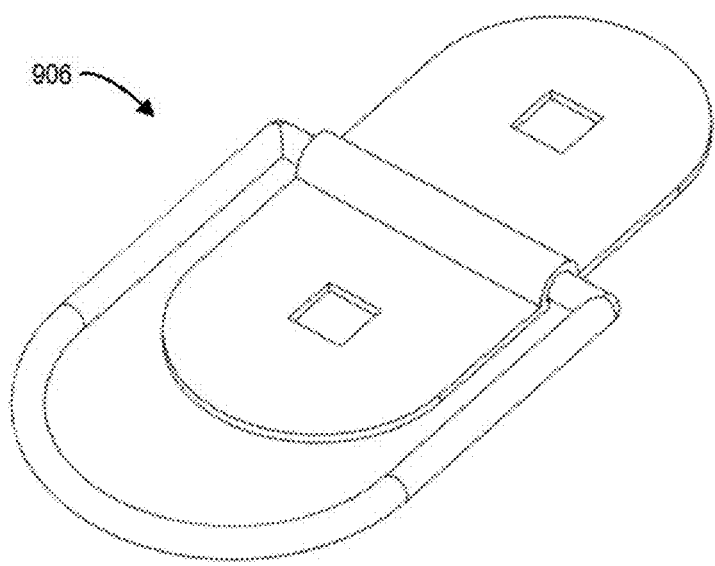
Figure 9G:
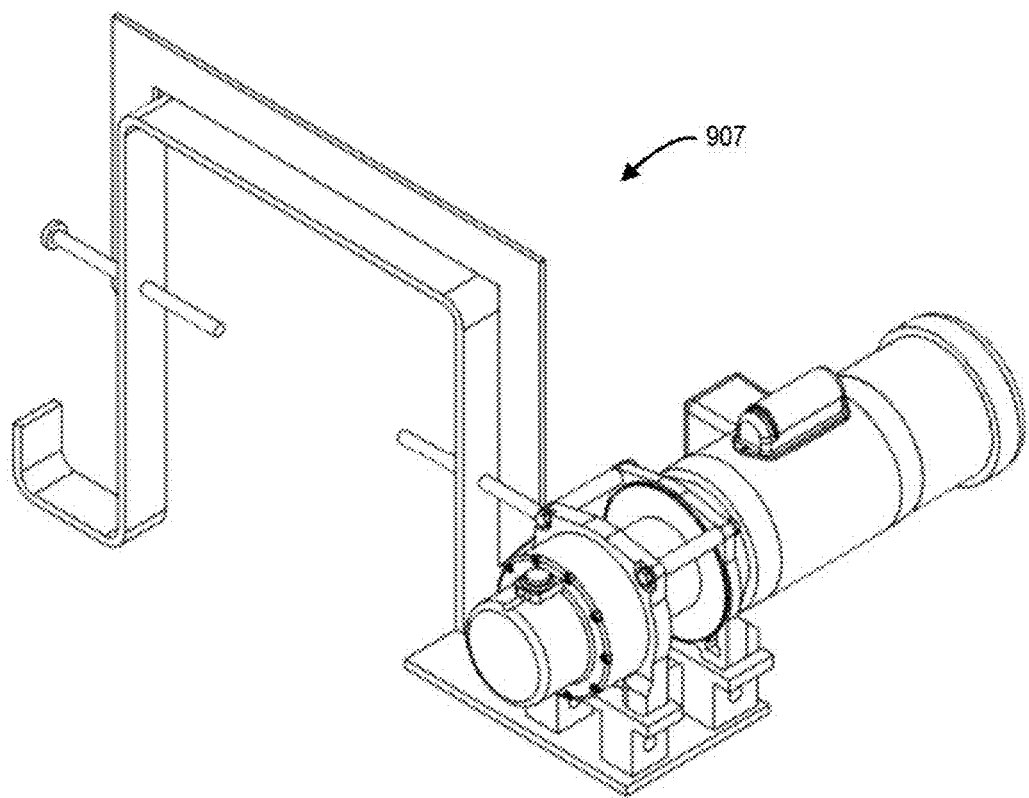

FIGS. 9A through 9D are roof clamps that might be provided according to some embodiments. FIGS. 9A and 9B are one example 901, 902 of roof clamps while FIGS. 9C and 9D are another example 903, 904 of roof clamps. This may let a system use any variety of roof clamps to handle the fixed tensioned line and moving hoist line. These clamps can bear pulleys, cleats, etc. As still other examples, FIG. 9E shows an eye loop bolt roof clamp 905, and FIG. 9 F shows a bolt-on-anchor roof clamp 906. According to some embodiments, a roof clamp 907 might include one or more rotary hoist motors as illustrated in FIG. 9G.

Figure 10A:
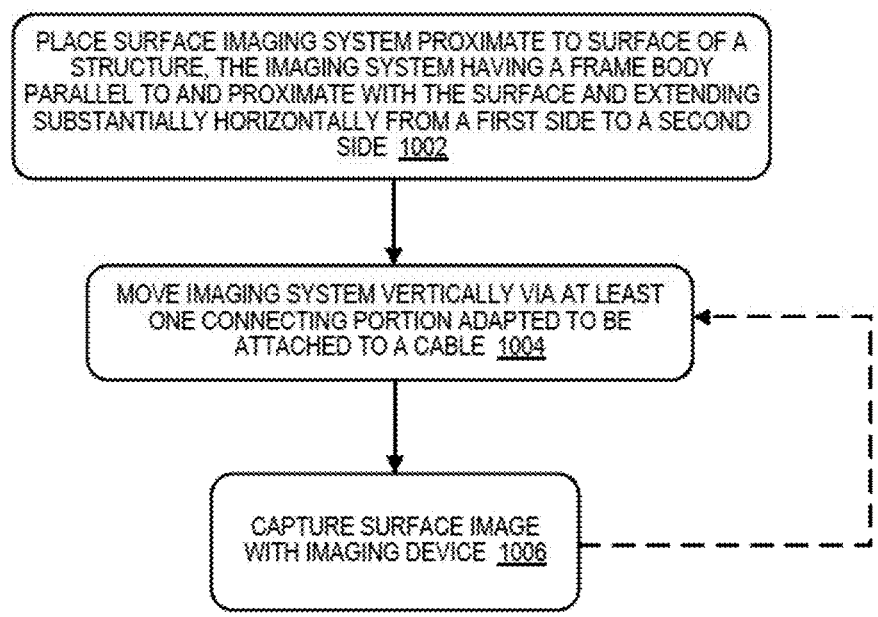
FIG. 10A is a surface imaging method in accordance with some embodiments.

In this way, the system may perform imaging of a surface in an efficient manner at least at par with current industry standards. For example, FIG. 10A illustrates a method that might be performed by some or all of the elements of the systems described herein according to various embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 1002, a surface imaging system may be placed proximate to a surface, the surface imaging system having a frame body parallel to and proximate with the surface and extending substantially horizontally from a first side to a second side. At 1004, the surface imaging system may be moved vertically via at least one connecting portion adapted to be attached to a cable. At 1006, the system may capture an image of the building surface with an imaging device (e.g., to be saved or reviewed in substantially real time by an operator). The overall process may then be repeated at 1004 as illustrated by the dashed arrow in FIG. 10A.

Figure 10B:
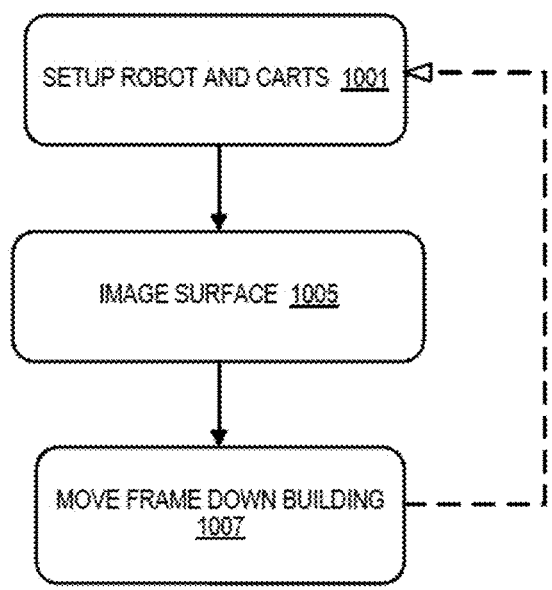
FIG. 10B is another imaging method in accordance with some embodiments.

FIG. 10B is another imaging method in accordance with some embodiments. At 1001, an operator may set up the robot and carts. For example, modules may be transported (and each individual piece can be lifted by at most two people). Note that such a robot might be assembled and launched on the ground or the roof of a building. The operator may also assemble frame by bolting frame modules together. At 1005, the operator may operate the surface imaging system. For example, the operator may send the robot to an initial altitude (e.g., a length below the topmost surface). The system would then descend at a determined pace at 1007; the operator may repeat this multiple times or iterate across the building.

Figure 11:
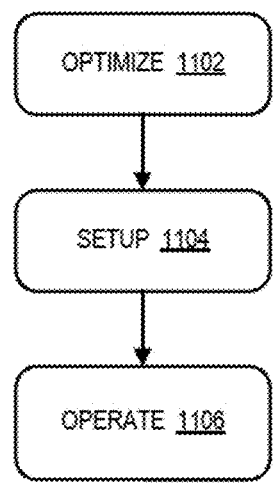
FIG. 11 is an operational method according to some embodiments.

FIG. 11 is an operational method according to some embodiments. At 1102, the system may optimize robot parameters per a given building (that is, many different parameters can be varied easily per building). For example, an overall frame length may be selected, a maximum number of frame modules to optimize horizontal spread may be selected, etc. An operator might also select a buffer spread (e.g., to determine an optimal distance from the building), an imaging device, buffer arm length, etc. The operator may then setup the system at 1104 in accordance with the optimized parameters and operate the system at 1106 to image the building surface.

Note that a human operator may have remote control over all of the robot's functions. Some instructions may be recorded to largely automate the process. Note that some or all of the robot's motors may have mechanical locks to prevent damage in the case of loss of power and/or communication. In some embodiments, voltage below nominal levels may limit the motors' maximum possible force to below a surface's tolerance. When power is lost or a mechanical failure occurs, the robot may simply not move and be perfectly safe to bring to the ground or roof. In some embodiments, load cells may be located across the robot as an electronic safety check and to help ensure that appropriate force is applied during inspecting or other surface imaging. Moreover, speeds may be digitally and mechanically limited and the robot may be operated at a relatively low voltage (e.g., 24 volts). In some embodiments, communications are hardwired. In some cases, wireless communication abilities may be employed. If communications are lost, the robot may simply lock and not move (again being safe to return to the ground or roof). Moreover, portions of the robot may be formed of metal rubber, fiberglass or other heat resistant materials (to minimize the risk of fire).

Figure 12:
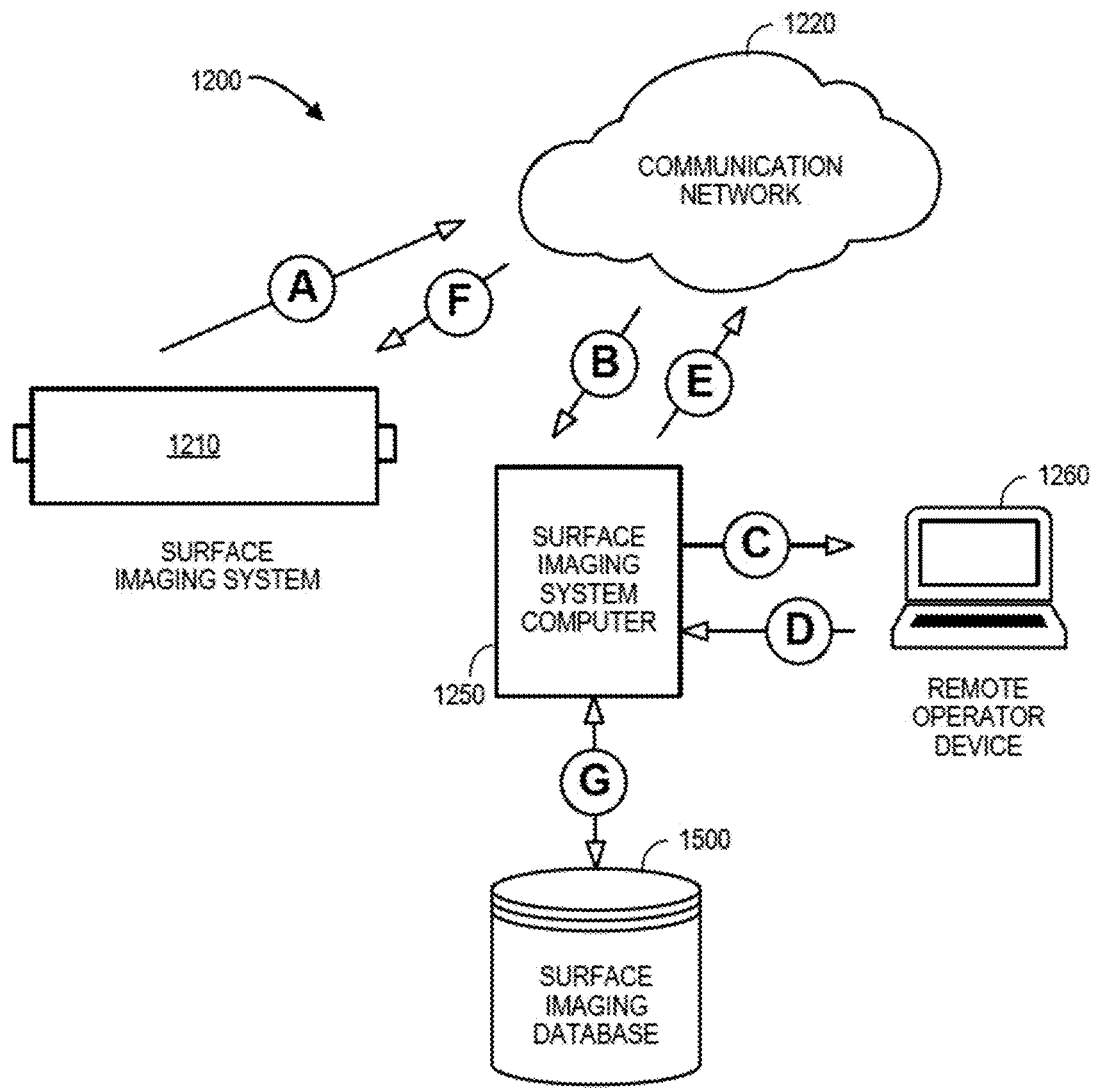
FIG. 12 is a surface imaging communication system in accordance with some embodiments.

FIG. 12 is block diagram of a system 1200 according to some embodiments of the present invention. A surface imaging system 1210 may exchange information with a surface imaging system computer 1250 via a communication network 1220. Some or all of the processes described herein might be performed automatically or be initiated via a command from a remote operator device 1260. As used herein, the term "automatically" may refer to, for example, actions that can be performed with little or no human intervention.

As used herein, devices, including those associated with the system 1200 and any other device described herein, may exchange information via any communication network which may be one or more of a hard-wired network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, an extranet, line-of-sign Infra-Red ("IR") communication, or analog radio signals. Note that any devices described herein may communicate via one or more such communication networks.

The surface imaging system computer 1250 may store information into and/or retrieve information from various data stores (e.g., the surface imaging database 1500), which may be locally stored or reside remote from the surface imaging system computer 1250. Although a single surface imaging system computer 1250 is shown in FIG. 12, any number of such devices may be included. Moreover, various devices described herein might be combined according to embodiments of the present invention. For example, in some embodiments, the surface imaging system computer 1250 and surface imaging database 1500 might comprise a single apparatus. Any of the system 1200 functions may be performed by a constellation of networked apparatuses, such as in a distributed processing or cloud-based architecture.

A user or administrator may access the system 1200 via the remote operator device 1260 (e.g., a Personal Computer ("PC"), tablet, or smartphone) to view information about, apply surface imaging, and/or manage operational information in accordance with any of the embodiments described herein. In some cases, an interactive graphical user interface display may let an operator or administrator define and/or adjust certain parameters (e.g., to define building parameters) and/or provide or receive automatically generated recommendations or results from the system 1200.

Figure 13:
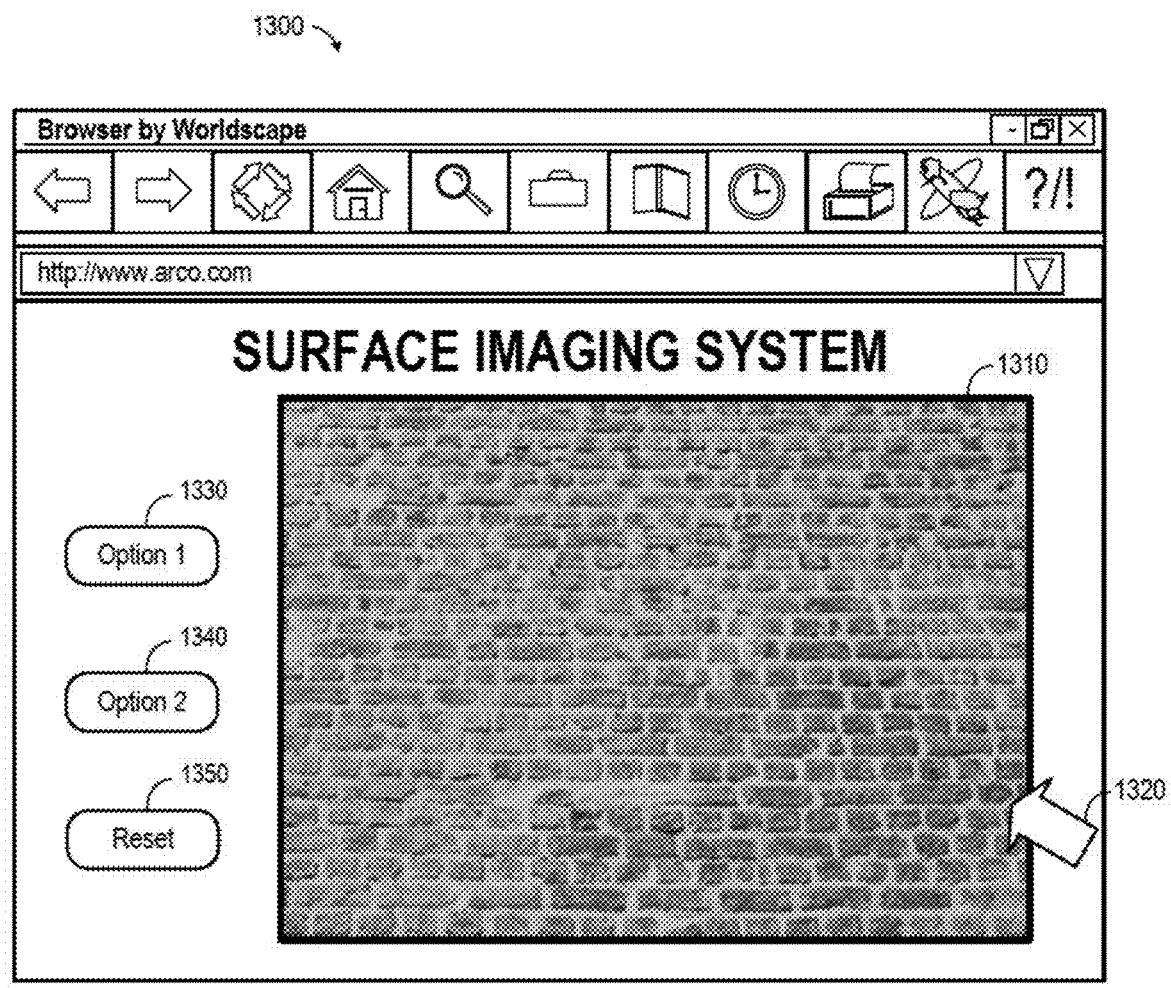
FIG. 13 is a surface imaging operator display according to some embodiments.

According to some embodiments, an administrator or operator interface may display various Graphical User Interface ("GUI") elements. For example, FIG. 13 illustrates a surface imaging system GUI display 1300 in accordance with some embodiments of the present invention. The display 1300 may include a graphical representation 1310 of an image captured by a camera in substantially real time. According to some embodiments, an administrator or operator may then select an element (e.g., via a touchscreen or computer mouse pointer 1320) to see more information about that element adjust movement of the system. Selection of an "Option 1" icon 1330, "Option 2" icon 1340, or "Reset" icon 1350 may also allow for alteration of the system's operation.

Figure 14:
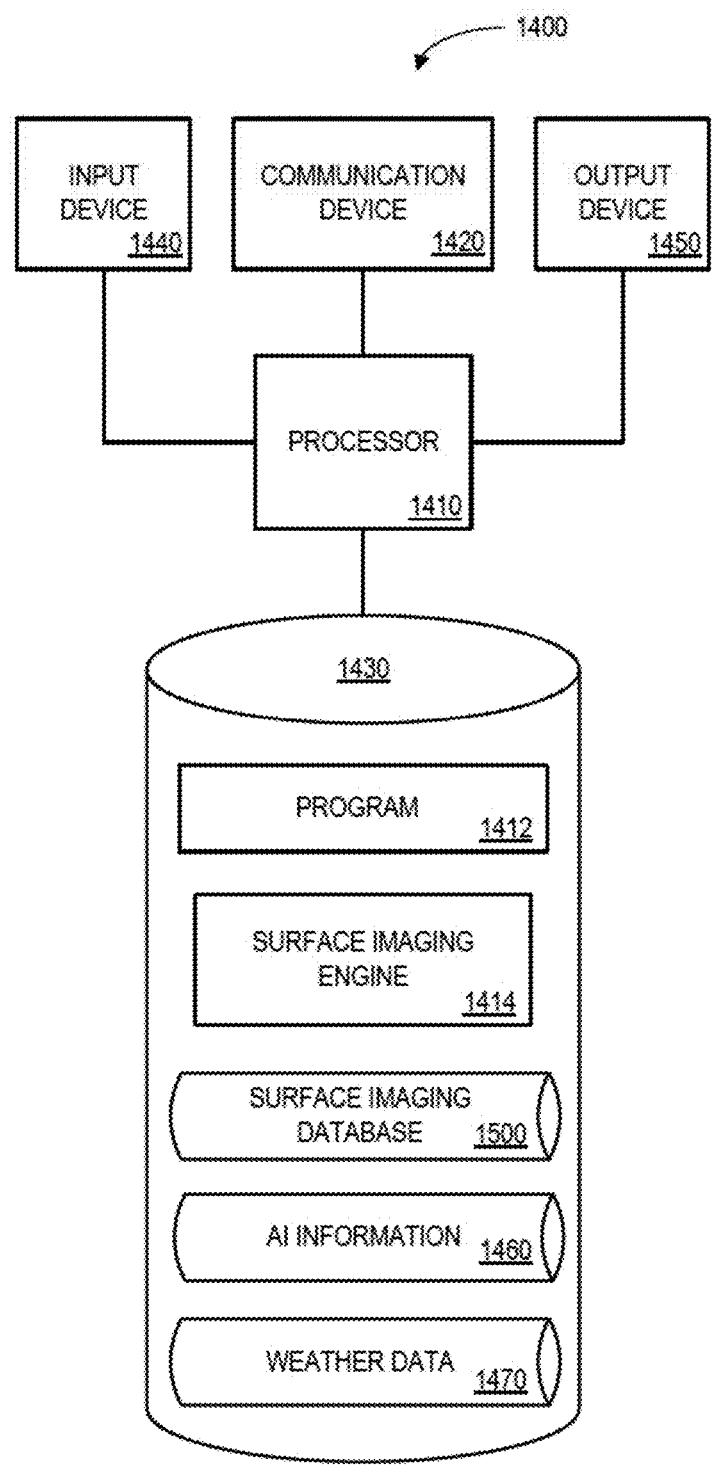
FIG. 14 is a surface imaging platform or apparatus in accordance with some embodiments.

The embodiments described herein may be implemented using any number of different hardware configurations. For example, FIG. 14 illustrates a platform or apparatus 1400 that may be, for example, associated with the system 1200 of FIG. 12 as well as the other systems described herein. The apparatus 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more surface imaging systems. The apparatus 1400 further includes an input device 1440 (e.g., a mouse and/or keyboard to define building parameters) and an output device 1450 (e.g., a computer monitor to display reports and surface imaging results to an administrator).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a surface imaging engine 1414 for controlling the processor 1410. The processor 1410 performs instructions of the programs 1412, 1414, and thereby operates in accordance with any of the embodiments described herein. For example, the processor 1410 may verify that a surface imaging system is proximate to a surface, the surface imaging system having a frame body parallel to and proximate with the surface and extending substantially horizontally from a first side to a second side. The processor 1410 may then move the surface imaging system vertically via at least one connecting portion adapted to be attached to a cable.

The programs 1412, 1414 may be stored in a compressed, uncompiled and/or encrypted format. The programs 1412, 1414 may furthermore include other program elements, such as an operating system, a database management system, and/or device drivers used by the processor 1410 to interface with peripheral devices.

As used herein, information may be "received" by or "transmitted" to, for example: (i) the apparatus 1400 from another device; or (ii) a software application or module within the apparatus 1400 from another software application, module, or any other source.

In some embodiments (such as shown in FIG. 14), the storage device 1430 further stores a surface imaging database 1500, AI information 1460, and weather data 1470. An example of a database that may be used in connection with the apparatus 1400 will now be described in detail with respect to FIG. 15. Note that the database described herein is only one example, and additional and/or different information may be stored therein. Moreover, various databases might be split or combined in accordance with any of the embodiments described herein.

Referring to FIG. 15, a table is shown that represents the surface imaging database 1500 that may be stored at the apparatus 1400 according to some embodiments. The table may include, for example, entries identifying surfaces that have been inspected or otherwise imaged. The table may also define fields 1502, 1504, 1506, 1508, 1510 for each of the entries. The fields 1502, 1504, 1506, 1508, 1510 may, according to some embodiments, specify: a surface imaging system identifier 1502, a building identifier 1504, a date and time 1506, an operator identifier 1508, and recorded movements 1510. The surface imaging database 1500 may be created and updated, for example, based on information received from an operator or administrator (e.g., when a new building is inspected).

The surface imaging system identifier 1502 may be, for example, a unique alphanumeric code associated with a particular robot. The building identifier 1504 and a date/time 1506 reflect when the surfaces were inspected and the operator identifier 1508 indicates who was controlling the robot during inspecting. The recorded movements 1510 can be used to review what happened (e.g., if something goes wrong) and/or to help the operator (or a new operator) during a subsequent inspection of the same surface.

Thus, embodiments may develop and deploy robots that inspect the exterior surfaces of high-rise buildings and apply time-tested methods and components in a novel robotics package. The approach may achieve superlative safety and efficiency and deliver capabilities beyond inspecting. The wider, adjustable span of the robot grants maximum reach and the robust design permits rapid ascent and descent. Embodiments may implement industry exceeding mechanical safety devices alongside computer-aided digital fail-safes. In some embodiments, integrated weatherproofing and aerodynamics let the robot operate during more extreme conditions, in the dark, etc. Moreover, components can readily be swapped, allowing for a wider range of service offerings. Embodiments may be fast, providing multiple descents per day, quicker descent and lateral movement, greater reach and range, etc. Embodiments will provide a safe environment by reducing human error, providing mechanical and digital fail-safes, tolerating harsher winds, rain, and cold, etc.

Although specific hardware and data configurations have been described herein, note that any number of other configurations may be provided in accordance with embodiments of the present invention (e.g., in other types of environments). Moreover, although some embodiments are focused on particular surface imaging techniques, any of the embodiments described herein could be applied to other types of surface imaging techniques.

Figure 16:
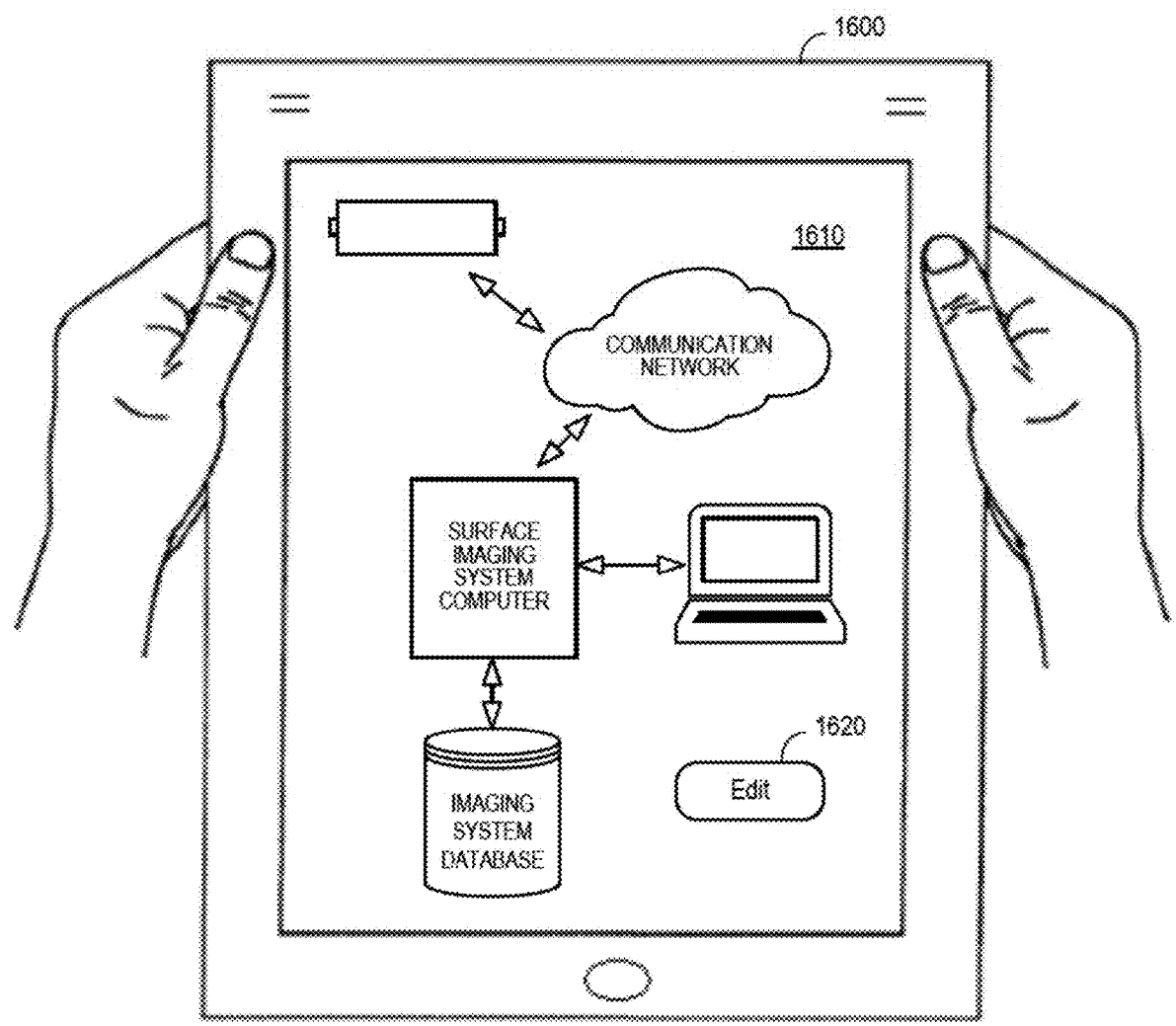
FIG. 16 is a computer tablet in accordance with some embodiments.

FIG. 16 illustrates a wireless or tabular device 1600 displaying elements of a system in accordance with some embodiments of the present invention. For example, in some embodiments, the device 1600 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly or hardwired with a remote entity. The device 1600 presents a display 1610 that may be used to display information about a surface imaging system. For example, the elements may be selected by an operator (e.g., via a touchscreen interface of the device 1600) to view more information about that element and/or to adjust settings or parameters associated with that element (e.g., to introduce a new building into the system).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for imaging a structure's substantially vertical surface, comprising:
   a frame body to be positioned parallel to and proximate with the surface and extend substantially horizontally from a first side to a second side;
   at least one first connecting portion to be attached to a first cable to provide for vertical movement of the frame body;
   at least one second connection portion to be attached to a second cable to limit undesired movement of the frame body and provide constant tension;
   a first buffer wheel located proximate the first side to roll vertically on the surface and absorb/distribute impulses via mechanical dampeners;
   a second buffer wheel located proximate the second side to roll vertically on the surface and absorb/distribute impulses via mechanical dampeners; and
   a plurality of surface imaging devices attached to the frame body.

2. The system of claim 1, wherein the surface imaging devices are associated with at least two of: (i) an optical camera, (ii) an infrared camera, (iii) a laser-based apparatus, and (iv) a radar-device apparatus.

3. The system of claim 1, wherein the surface imaging is associated with inspection for at least one of: (i) hairline cracks, (ii) voids, and (iii) other structural and/or surface defects.

4. The system of claim 1, wherein the structure is associated with at least one of: (i) a building, (ii) a multi-story building, (iii) a skyscraper, (iv) an office building, (v) a warehouse, (vi) a stadium, (vii) a wall, (viii) a bridge, (ix) a monument, (x) a dam, (xi) an apartment building, (xii) an airport structure, and (xiii) a man-made structure with at least 10,000 square feet of exterior surfaces.

5. The system of claim 1, wherein the substantially vertical surface is associated with at least one of: (i) a wall, (ii) masonry, (iii) brick, (iv) stone, (v) steel, (vi) concrete, (vii) cement, (viii) iron and alloys, (ix) terracotta, (x) metal, and (xi) glass.

6. The system of claim 1, wherein movement of the frame body is controlled by at least one rotary hoist motor and communication with a remote computer.

7. The system of claim 6, wherein the movement is controlled by a human operator via a user interface.

8. The system of claim 1, further comprising:
   at least one rotary hoist motor mounted on the frame body, the ground proximate to, or the roof of the building to be imaged.

9. The system of claim 1, wherein a hoisting apparatus is attachable at several different locations on the frame body.

10. The system of claim 1, further comprising:
    an anemometer attached to the frame body.

11. The system of claim 1, further comprising sensors attached to the frame body to detect sudden movement of the frame body.

12. The system of claim 1, further comprising:
    an expanding, folding arm including:
      an attached portion coupled to the frame body,
      an expanded portion to hold at least one imaging device, and
      a mechanical hinge connecting the attached portion to the expanded portion of the expanding, folding arm, wherein the expanding, folding arm carries at least one imaging device.

13. The system of claim 12, wherein a first expanding, folding arm is located proximate to the first side and a second expanding, folding arm is located proximate to the second side of the frame body.

14. A method for imaging a structure's substantially vertical surface, comprising:
placing a surface imaging system proximate to the surface, the surface imaging system having a frame body parallel to and proximate with the surface and extending substantially horizontally from a first side to a second side;
moving the surface imaging system vertically via at least one first connecting portion adapted to be attached to a first cable to provide for vertical movement of the frame body, wherein: (i) at least one second connection portion is attached to a second cable to limit undesired movement of the frame body and provide constant tension, (ii) a first buffer wheel located proximate the first side to roll vertically on the surface and absorb/distribute impulses via mechanical dampeners, and (iii) a second buffer wheel located proximate the second side to roll vertically on the surface and absorb/distribute impulses via mechanical dampeners; and
performing surface imaging of the surface with a plurality of surface imaging devices attached to the frame body.

15. The method of claim 14, wherein the surface imaging devices are associated with at least two of: (i) an optical camera, (ii) an infrared camera, (iii) a laser-based apparatus, and (iv) a radar-device apparatus.

16. The method of claim 14, wherein the surface imaging is associated with inspection for at least one of: (i) hairline cracks, (ii) voids, and (iii) other structural and/or surface defects.

17. The method of claim 14, wherein the structure is associated with at least one of: (i) a building, (ii) a multi-story building, (iii) a skyscraper, (iv) an office building, (v) a warehouse, (vi) a stadium, (vii) a wall, (viii) a bridge, (ix) a monument, (x) a dam, (xi) an apartment building, (xii) an airport structure, and (xiii) a man-made structure with at least 10,000 square feet of exterior surfaces.

\* \* \* \* \*